United States Patent [19]

Herchen et al.

[11] 4,386,150
[45] May 31, 1983

[54] NOVEL IMAGE DYE-PROVIDING MATERIALS AND PHOTOGRAPHIC PRODUCTS AND PROCESSES

[75] Inventors: Stephen R. Herchen, Duxbury; Gary N. Widiger, Lexington, both of Mass.

[73] Assignee: Polaroid Corporation, Cambridge, Mass.

[21] Appl. No.: 331,995

[22] Filed: Dec. 18, 1981

[51] Int. Cl.³ .................. G03C 1/40; G03C 1/10; G03C 5/54
[52] U.S. Cl. ...................... 430/222; 430/223; 430/224; 430/225; 430/226; 430/241; 430/242; 430/243; 430/559; 430/561; 430/562; 430/563
[58] Field of Search .......... 430/222, 223, 224, 225, 430/226, 559, 561, 562, 563, 241, 242, 243

[56] References Cited

U.S. PATENT DOCUMENTS

| | | | |
|---|---|---|---|
| 3,245,789 | 4/1966 | Rogers | 430/223 |
| 3,628,952 | 12/1971 | Puschel et al. | 430/223 |
| 3,844,785 | 10/1974 | Puschel et al. | 430/223 |
| 3,883,529 | 5/1975 | Austin | 260/249.5 |
| 3,956,300 | 5/1976 | Austin | 260/249.5 |
| 4,237,281 | 12/1980 | Long | 544/99 |
| 4,264,507 | 4/1981 | Borror et al. | 430/224 |
| 4,264,701 | 4/1981 | Loeatell et al. | 430/17 |

FOREIGN PATENT DOCUMENTS

| | | |
|---|---|---|
| 895041 | 10/1953 | Fed. Rep. of Germany . |
| 2460491 | 7/1976 | Fed. Rep. of Germany . |
| 1423346 | 4/1973 | United Kingdom . |
| 2016031 | 9/1979 | United Kingdom . |

OTHER PUBLICATIONS

Chem. Abst. No. 91: 176663m, Kitzing, 1979.
Derwent Abstract No. 37370c/21 of Japanese application 123076, 11/80.

*Primary Examiner*—Richard L. Schilling
*Attorney, Agent, or Firm*—Gaetano D. Maccarone

[57] ABSTRACT

Diffusion transfer photographic color processes and products are described utilizing novel image dye-providing materials which provide image dyes having the chromophoric system represented by the formula

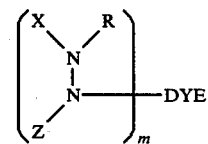

wherein X is

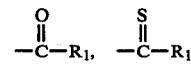

or $-SO_2-R_1$; Z is H, alkyl or aryl; R is H, alkyl or aryl; DYE is any dye moiety; $R_1$ is H, alkyl, aryl, $-NH_2$, $-NHR_2$, $-N(R_2)_2$ or $-OR_2$; $R_2$ is H, alkyl or aryl; and m is 1 or 2. The image dye providing material includes a diffusion control moiety such as a hydroquinonyl group or a precursor thereof and may be diffusible or nondiffusible as a function of the diffusion control moiety.

22 Claims, No Drawings

NOVEL IMAGE DYE-PROVIDING MATERIALS AND PHOTOGRAPHIC PRODUCTS AND PROCESSES

CROSS REFERENCE TO RELATED APPLICATIONS

Reference is made to copending, commonly assigned patent application Ser. No. 332,020, filed on even date herewith.

BACKGROUND OF THE INVENTION

This invention relates to photography in general and, more particularly, to dyes which are useful in providing diffusion transfer color images and to photographic products and processes employing such dyes.

Multicolor images formed in accordance with the principles of subtractive color photography employ yellow, magenta and cyan image dyes. The yellow dye ideally transmits only green and red light and absorbs only blue light, and thus is sometimes referred to as "minus blue". In like manner, the magenta ("minus green") dye ideally absorbs only green light and transmits only blue and red light, and the cyan ("minus red") dye ideally absorbs only red light and transmits only blue and green light. Unfortunately, the dyes available for use in subtractive color photography are not "ideal" dyes, but tend to absorb some of the light that they ideally should transmit. This extra absorption results in less effective reproduction by the final image of one or more colors present in the original subject.

This problem may be illustrated by considering the reproduction of blue light: a multicolor photosensitive element, containing a blue-sensitive silver halide layer, a green-sensitive silver halide layer and a red-sensitive silver halide layer, said silver halide layers having associated therewith, respectively, a yellow image dye-providing material, a magenta image dye-providing material, and a cyan image dye-providing material, is exposed to blue light in an amount effective to fully expose the blue-sensitive layer. Only the blue-sensitive silver halide layer is exposed; the green-sensitive and red-sensitive silver halide emulsion layers remain unexposed. If such an exposed photosensitive element were processed by diffusion transfer techniques, the yellow image dye-providing material would remain in the developed photosensitive element (negative component) but magenta and cyan image dyes would be transferred to the image-receiving layer (positive component). Since the magenta and cyan image dyes are "minus green" and "minus red" respectively, the combination of magenta and cyan dyes appear blue, i.e., they transmit blue light to the viewer and absorb green and red, thus reproducing the blue record of the original subject.

The present application is drawn to novel image dye-providing materials which are useful in photography and to photographic products and processes utilizing such materials.

SUMMARY OF THE INVENTION

It is therefore the object of this invention to provide novel compounds.

It is another object to provide image dye-providing materials which are useful in photography.

It is still another object to provide image dye-providing materials which include a diffusion control moiety and which are useful in diffusion transfer photographic applications.

It is a further object to provide dye developers which are useful in diffusion transfer photographic applications.

Still another object is to provide image dye-providing materials which are useful in dye release diffusion transfer processes, for example, of the redox dye release or the silver-catalyzed dye release types.

Yet another object is to provide novel photographic products and processes.

A further object is to provide novel diffusion transfer photographic products and processes.

BRIEF SUMMARY OF THE INVENTION

These and other objects and advantages are accomplished in accordance with the invention by providing image dye-providing materials which provide image dyes having the chromophoric system represented by the formula

FORMULA A

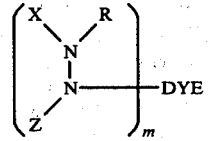

wherein X is

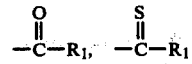

or $-SO_2-R_1$; Z is H, alkyl, preferably having 2 or 3 carbon atoms, or aryl such as phenyl or naphthyl; R is H, alkyl, preferably having 2 or 3 carbon atoms, or aryl such as phenyl or naphthyl; DYE is any dye moiety having an absorption peak within the ultraviolet, visible and infrared regions of the electromagnetic spectrum and which exhibits substantial absorption in the visible region thus enabling it to be seen by the human eye; $R_1$ is H, alkyl, preferably having 2 or 3 carbon atoms, aryl such as phenyl or naphthyl, $-NH_2$, $-NHR_2$,

or $-OR_2$; $R_2$ is H, alkyl, preferably having 2 or 3 carbon atoms, or aryl such as phenyl or naphthyl; and m is 1 or 2. Where Z, R, $R_1$ and $R_2$ are alkyl, the chain length can vary considerably dependent upon the characteristics desired. For example, where it is desired to have a ballast group in the compound, one or more of these groups may be a relatively long alkyl chain having 15 carbon atoms or more.

The image dye-providing materials include a diffusion control moiety such as a hydroquinonyl group, or a precursor thereof, and may be diffusible or nondiffusible as a function of the diffusion control moiety.

The dye moiety of the image dye-providing materials may be of any type such as, for example, azo dyes, azomethine dyes, xanthene dyes, anthraquinone dyes, cyanine dyes, phthalocyanine dyes, nitrophenyl dyes, quinone-methide dyes, etc. The image dye-providing materials of the invention may be symmetrical or unsymmetrical compounds.

In the photographic diffusion transfer processes of the invention the desired image is obtained by processing an exposed photosensitive silver halide material with a processing composition distributed between two sheet-like elements, one of said elements including said photosensitive material. The processing composition is so applied and confined within and between the two sheet-like elements as not to contact or wet outer surfaces of the superposed elements, thus providing a film unit or film packet whose outer surfaces are dry. The processing composition may be viscous or nonviscous and preferably is distributed from a single-use container; such pressure rupturable processing composition containers are frequently referred to as "pods". The final image may be monochrome or multicolor and is formed in an image-receiving layer included in one of said sheet-like elements.

As is well known in diffusion transfer photography, the image dye-providing materials which may be utilized in such processing generally may be characterized as either (1) initially soluble or diffusible in the processing composition but which are selectively rendered nondiffusible imagewise as a function of development; or (2) initially insoluble or nondiffusible in the processing composition but which selectively provide a diffusible product imagewise as a function of development. The image dye-providing materials of the invention may be complete dyes or dye intermediates, e.g., color couplers. The requisite differential in mobility or solubility may, for example, be obtained by a chemical reaction such as a redox reaction, a coupling reaction or a cleavage reaction.

The image dye-providing materials which are capable of providing image dyes including the chromophoric system of Formula A include a diffusion control substituent, Y, which substituent includes a diffusion control moiety, D. One such group of image dye-providing materials according to the invention is represented by the formula

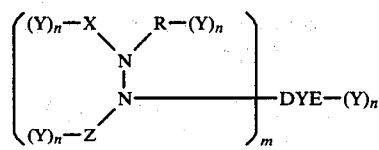

FORMULA B where each Y is a substituent including at least one diffusion control moiety and each n is 0 or 1, provided that at least one n is 1, and X, Z, R and m are as previously defined. The image dye-providing materials of the invention may have the diffusion control moiety attached to the dye moiety or to the hydrazine moiety or these materials may include diffusion control moieties attached to the dye moiety and to the hydrazine moiety as will be apparent further below.

In such image dye-providing materials, the diffusion control substituent, Y, may be represented by —E—Dev where Dev is a hydroquinonyl group or a precursor thereof, and E is a covalent bond or a divalent linking group such as, for example, alkylene.

Image dye-providing materials within Formula B, as a function of the particular diffusion control moiety, D, which is present are suitable for use in diffusion transfer processes employing either initially diffusible or initially nondiffusible image dye-providing materials. Typical diffusion control moieties include hydroquinonyl groups, color coupling groups, sulfonamido phenol groups which cleave or ring close following oxidation to release a diffusible dye or dye intermediate, and thiazolidine groups whose cleavage is silver catalyzed. The diffusion control moiety, D, may be attached by a covalent bond or a divalent organic radical, for example, an alkylene radical to complete the diffusion control substituent, Y. Further, where the image dye-providing material is initially diffusible a suitable ballast group, for example, a long chain alkyl group, may be attached to the diffusion control moiety.

DESCRIPTION OF THE PREFERRED EMBODIMENTS

Image dye-providing materials of the invention are represented by the formulas:

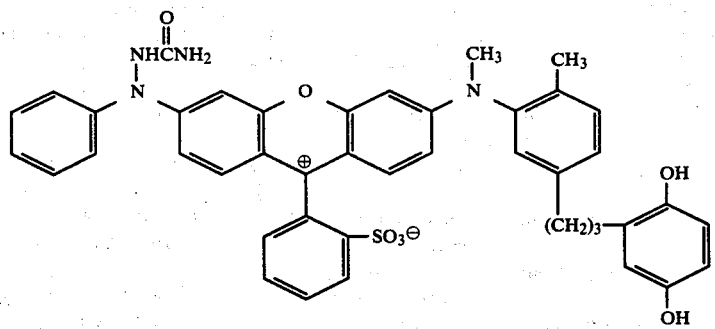

DYE I

-continued
DYE II
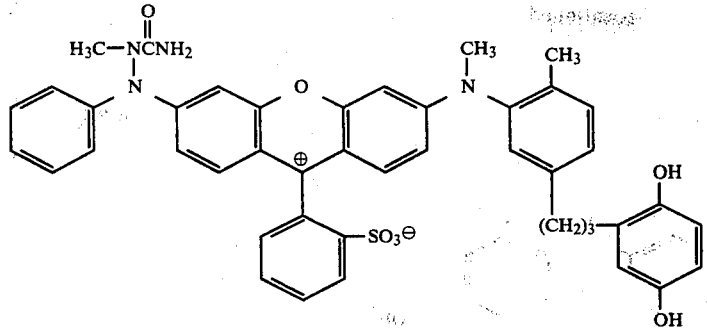
DYE III
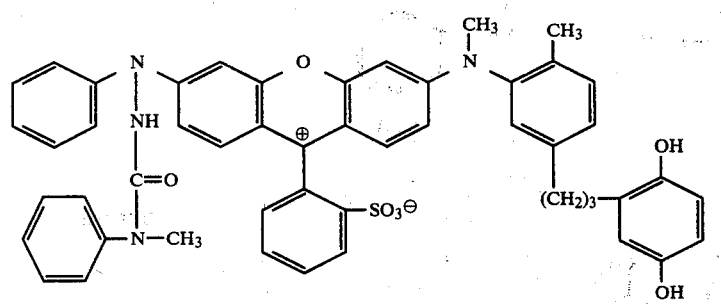
DYE IV
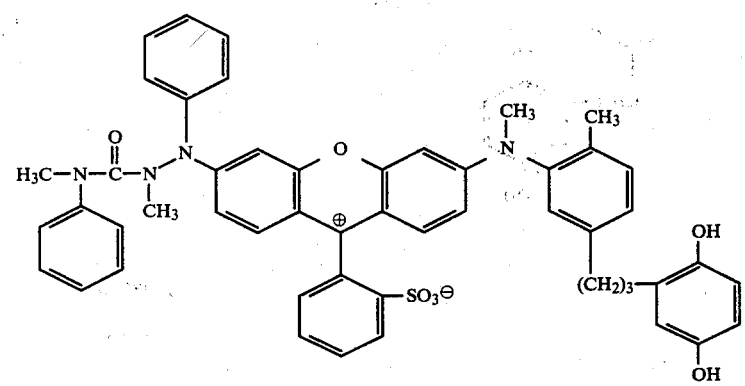
DYE V
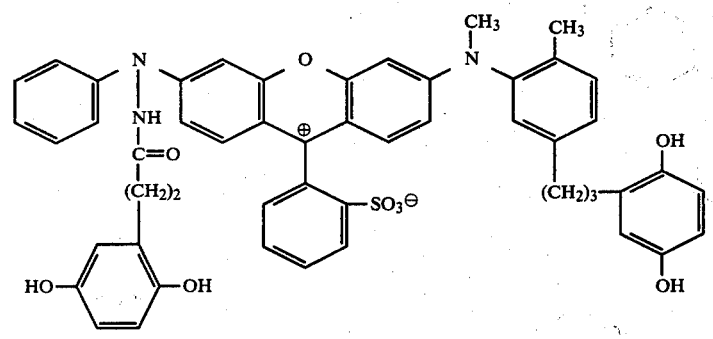
DYE VI
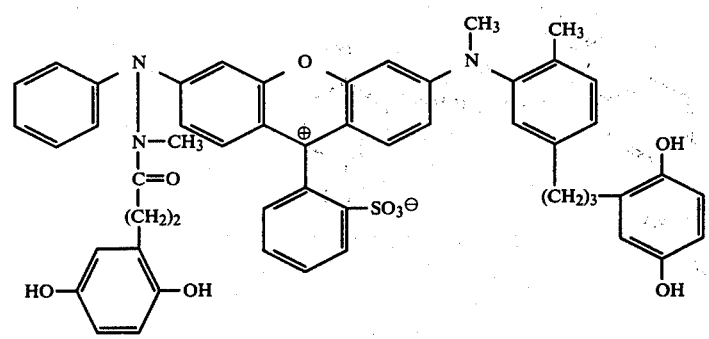

-continued
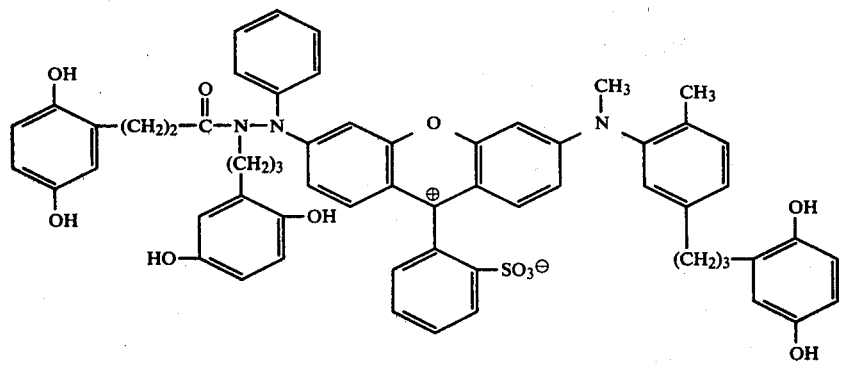
DYE VII
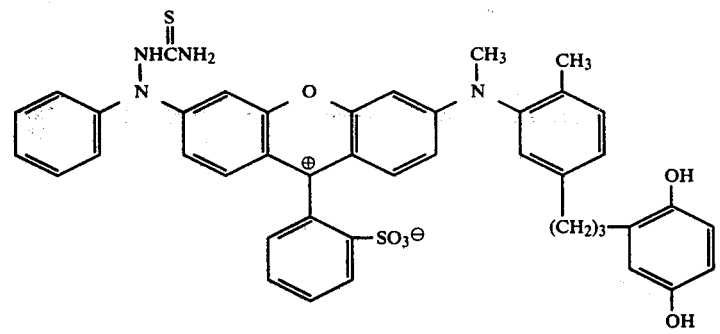
DYE VIII
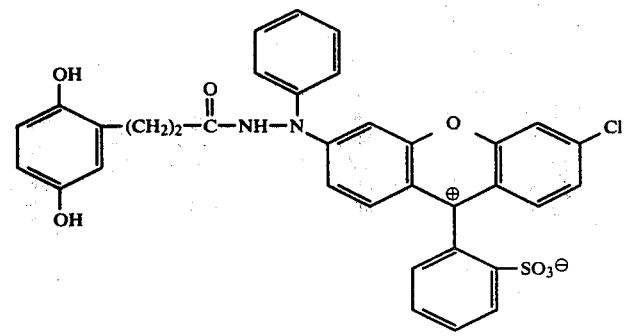
DYE IX
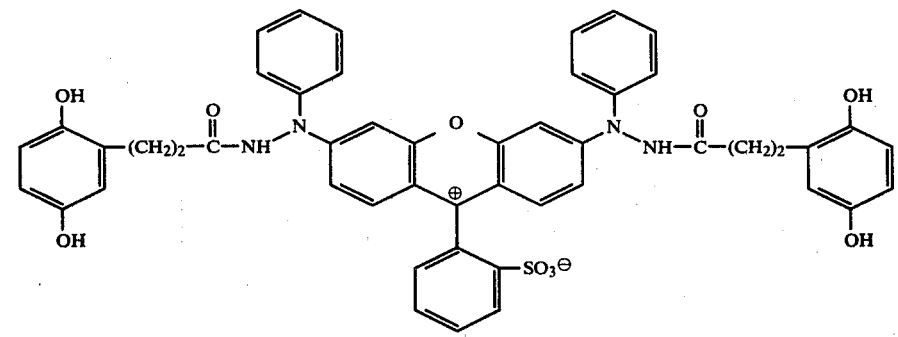
DYE X -continued
DYE XI
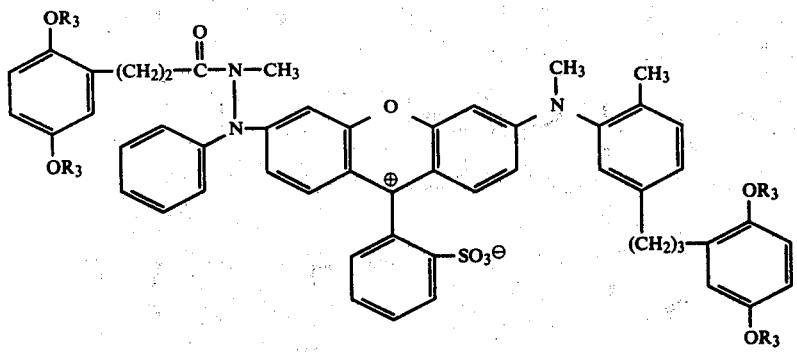
(R₃ is $-\overset{O}{\underset{\|}{C}}-O-(CH_2)_2-SO_2-CH_3$)
DYE XII
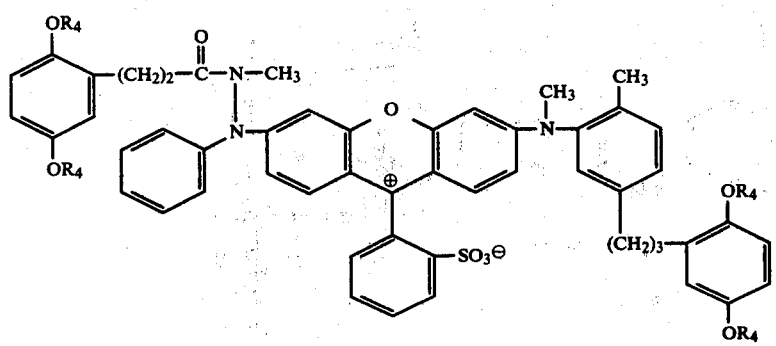
(R₄ is $-\overset{O}{\underset{\|}{C}}-O-\underset{\underset{CH_3}{|}}{CH}-CH_2-\overset{O}{\underset{\|}{C}}OC_2H_5$)
DYE XIII
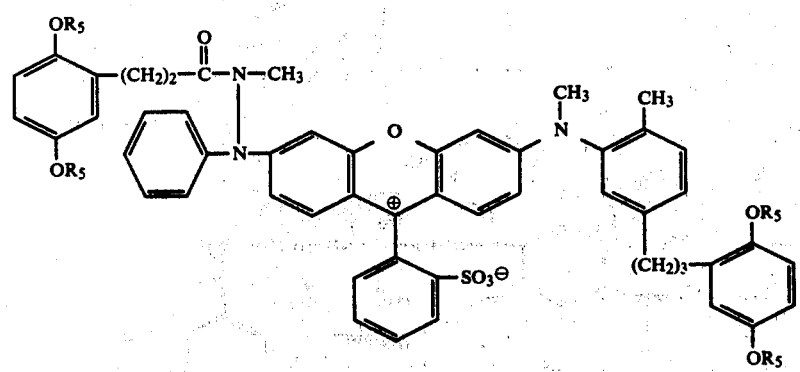
(R₅ is $-\overset{O}{\underset{\|}{C}}-O-(CH_2)_2-SO_2-\phi$ )
DYE XIV
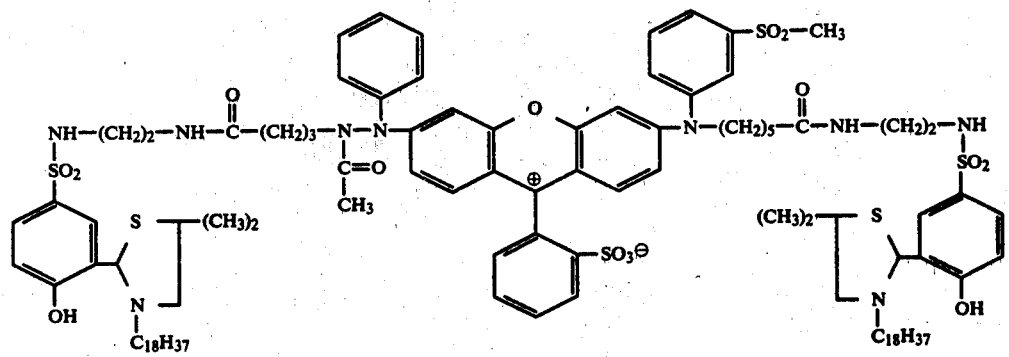

-continued
DYE XV
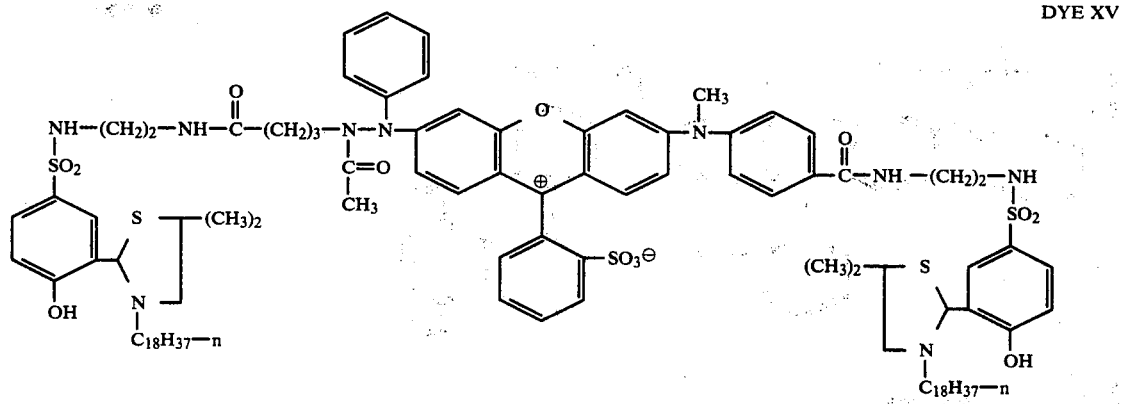
DYE XVI
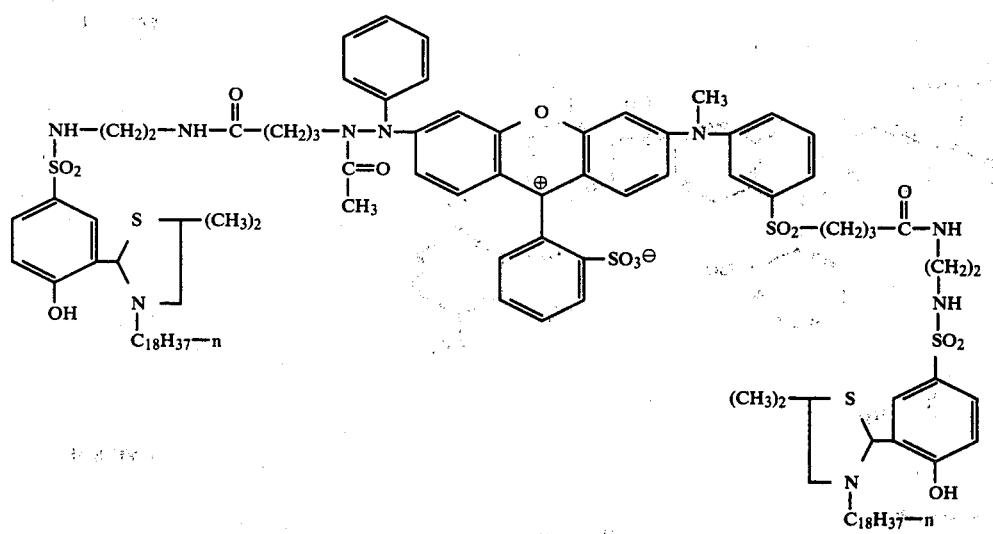
DYE XVII
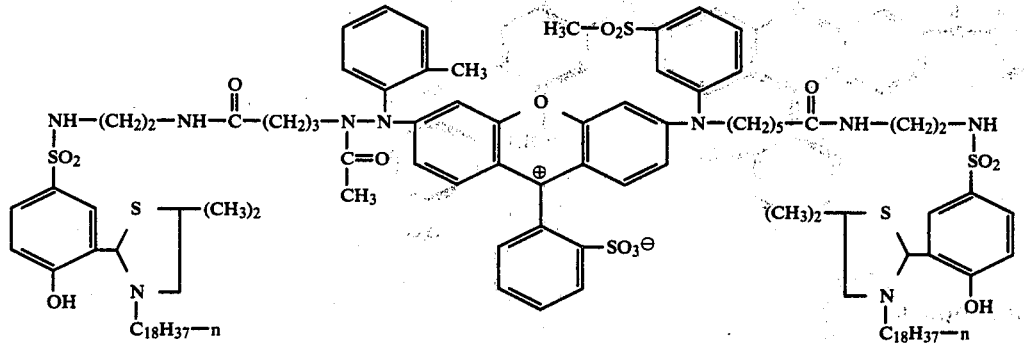
DYE XVIII
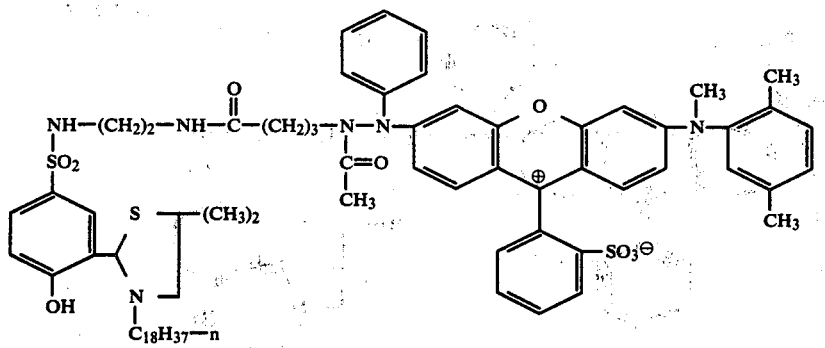

-continued
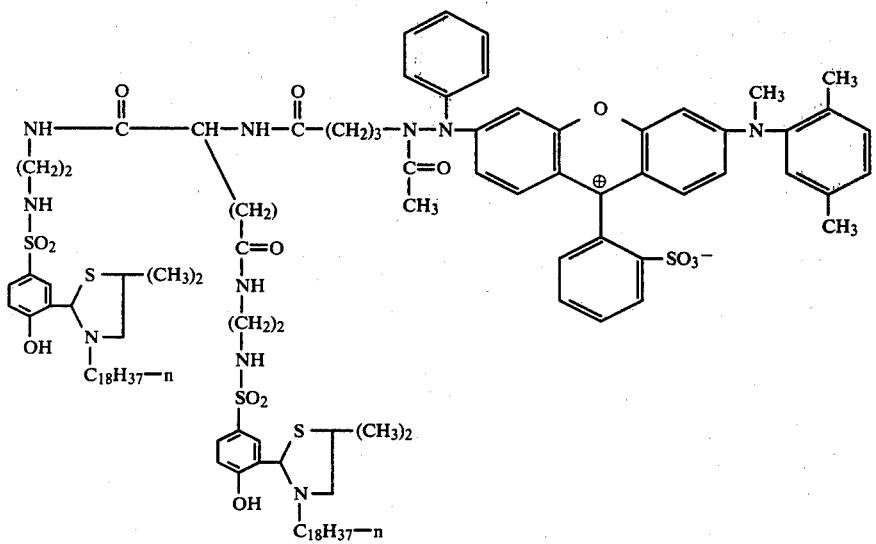
DYE XIX
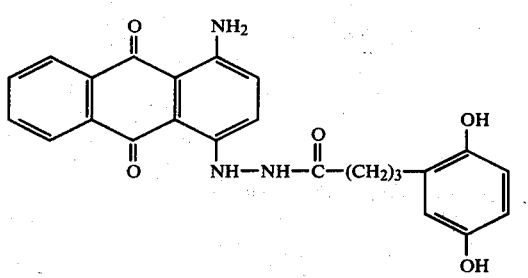
DYE XX
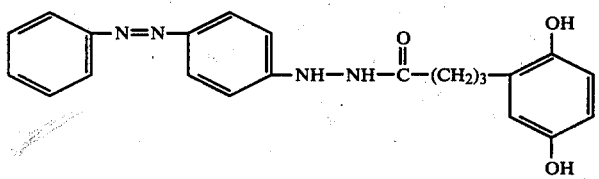
DYE XXI
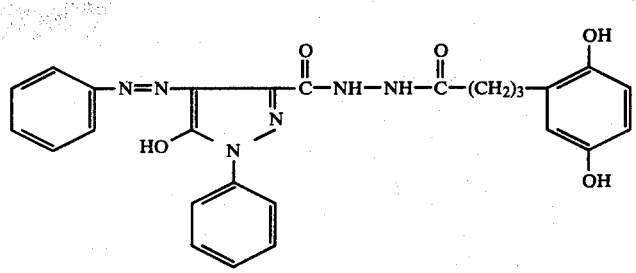
DYE XXII
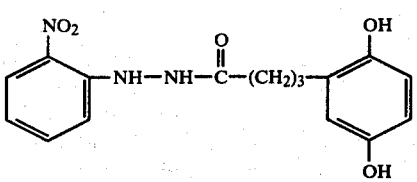
DYE XXIII -continued

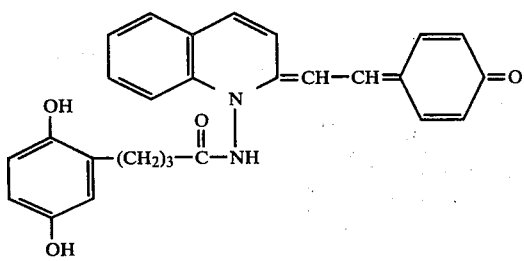

DYE XXIV

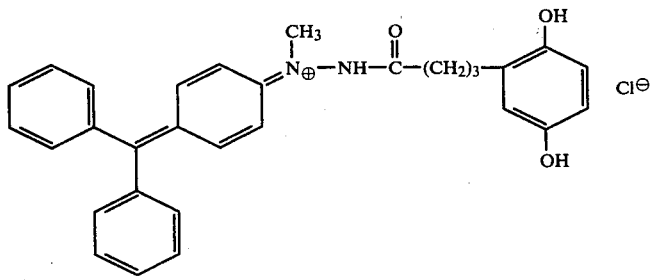

DYE XXV

As disclosed previously the image dye-providing materials of the invention include a diffusion control moiety such as a hydroquinonyl group or a precursor thereof. Dyes XI, XII and XIII include diffusion control moieties which are precursors of a hydroquinonyl group. When the compounds come in contact with an aqueous alkaline processing composition during photographic processing, the ester groups are cleaved and the hydroquinonyl groups are formed.

In general, the image dye-providing materials of the invention can be prepared by reacting the dye moiety with a small excess of an appropriate hydrazide compound in the presence of a solvent and base. For example, the sulfoxanthene hydrazide compounds can be prepared by heating a substituted chlorosulfoxanthene with an excess of a hydrazide in the presence of a solvent and base. As noted previously, each substituent, Y, may include one or more diffusion control moiety(ies). Compounds wherein the substituent, Y, includes more than one diffusion control moiety can be prepared by judicious choice of hydrazide, dye, alkylating agent or by making subsequent modifications.

The xanthene image dye-providing materials of the invention typically have broader absorption bandwidths and shorter λ max than the corresponding amino derivatives. The absorption properties of these materials can be utilized to address metamerism considerations when they are used in combination with other image dye-providing materials in multicolor photographic systems.

The image dye-providing materials of the invention may be used generally in association with any silver halide emulsion. The image dye-providing materials may be characterized as either (1) initially soluble or diffusible in the processing composition but which are selectively rendered nondiffusible imagewise as a function of development; or (2) initially insoluble or nondiffusible in the processing composition but which selectively provide a diffusible product imagewise as a function of development. The image dye-providing materials may be complete dyes or dye intermediates, e.g., color couplers. The requisite differential in mobility or solubility may be obtained, for example, by a chemical reaction such as a redox reaction, a coupling reaction or a cleavage reaction. In a particularly preferred embodiment of the invention, the image dye-providing materials are dye developers which are initially diffusible materials. The dye developers contain, in the same molecule, both the chromophoric system of a dye and a silver halide developing function as is described in U.S. Pat. No. 2,983,606. Other image dye-providing materials of the invention are: initially diffusible coupling dyes such as are useful in the diffusion transfer process described in U.S. Pat. No. 3,087,817 and which are rendered nondiffusible by coupling with the oxidation product of a color developer; initially nondiffusible dyes which release a diffusible dye following oxidation, sometimes referred to as "redox dye releaser" dyes, such as described in U.S. Pat. Nos. 3,725,062 and 4,076,529; initially nondiffusible image dye-providing materials which release a diffusible dye following oxidation and intramolecular ring closure as are described in U.S. Pat. No. 3,443,940 or undergo silver assisted cleavage to release a diffusible dye in accordance with the disclosure of U.S. Pat. No. 3,719,489; and initially nondiffusible image dye-providing materials which release a diffusible dye following coupling with an oxidized color developer as described in U.S. Pat. No. 3,227,550.

The diffusion transfer film units of the invention include those wherein the image receiving element is designed to be separated from the photosensitive element after processing and integral positive-negative diffusion transfer film units which are retained intact after processing. In a preferred embodiment the diffusion transfer film units of the invention utilize initially diffusible dye developers as the image dye-providing materials. As described in U.S. Pat. No. 2,983,606, a photosensitive element containing a dye developer and a silver halide emulsion is photoexposed and a processing composition applied thereto, for example, by immersion, coating, spraying, flowing, etc., in the dark. The exposed photosensitive element is superposed prior to, during, or after the processing composition is applied, on a sheet-like support element which may be utilized as an image-receiving element. In a preferred embodiment, the processing composition is applied to the exposed photosensitive element in a substantially uniform layer as the photosensitive element is brought into superposed relationship with the image-receiving layer. The processing composition, positioned intermediate the photosensitive element and the image-receiving layer, permeates the emulsion to initiate development of the latent image contained therein. The dye developer is immobilized or precipitated in exposed areas as a consequence of the development of the latent image. This immobilization is apparently, at least in part, due to a change in the solubility characteristics of the dye developer upon oxidation and especially as regards its solubility in alkaline solutions. It may also be due in part to a tanning effect on the emulsion by oxidized developing agent, and in part to a localized exhaustion of alkali as a result of development. In unexposed and partially exposed areas of the emulsion, the dye developer is unreacted and diffusible and thus provide an imagewise distribution of unoxidized dye developer, diffusible in the processing composition, as a function of the point-to-point degree of exposure of the silver halide emulsion. At least part of this imagewise distribution of unoxidized dye developer is transferred, by imbibition, to a superposed image-receiving layer or element, said transfer substantially excluding oxidized dye developer. The image-receiving layer receives a depthwise diffusion, from the developed emulsion, of unoxidized dye developer without appreciably disturbing the imagewise distribution thereof to provide a reversed or positive color image of the developed image. The image-receiving element may contain agents adapted to mordant or otherwise fix the diffused, unoxidized dye developer. In a preferred embodiment of said U.S. Pat. No. 2,983,606 and in certain commercial applications thereof, the desired positive image is revealed by separating the image-receiving layer from the photosensitive element at the end of a suitable imbibition period. Alternatively, as also disclosed in said U.S. Pat. No. 2,983,606, the image-receiving layer need not be separated from its superposed contact with the photosensitive element, subsequent to transfer image formation, if the support for the image-receiving layer, as well as any other layers intermediate said support and image-receiving layer, is transparent and a processing composition containing a substance, e.g., a white pigment, effective to mask the developed silver halide emulsion or emulsions is applied between the image-receiving layer and said silver halide emulsion or emulsions.

Dye developers, as noted in said U.S. Pat. No. 2,983,606, are compounds which contain, in the same molecule, both the chromophoric system of a dye and also a silver halide developing function. By "a silver halide developing function" is meant a grouping adapted to develop exposed silver halide. A preferred silver halide development function is a hydroquinonyl group. In general, the development function includes a benzenoid developing function, that is, an aromatic developing group which forms quinonoid or quinone substances when oxidized.

Multicolor images may be obtained using dye developers in diffusion transfer processes by several techniques. One such technique contemplates obtaining multicolor transfer images utilizing dye developers by employment of an integral multilayer photosensitive element, such as is disclosed in the aforementioned U.S. Pat. No. 2,983,606 and in U.S. Pat. No. 3,345,163, wherein at least two selectively sensitized photosensitive strata, superposed on a single support, are processed, simultaneously and without separation, with a single common image-receiving layer. A suitable arrangement of this type comprises a support carrying a red-sensitive silver halide emulsion stratum, a green-sensitive silver halide emulsion stratum and a blue-sensitive silver halide emulsion stratum, said emulsions having associated therewith, respectively, for example, a cyan dye developer, a magenta dye developer and a yellow dye developer. The dye developer may be utilized in the silver halide emulsion stratum, for example in the form of particles, or it may be disposed in a stratum behind the appropriate silver halide emulsion strata. Each set of silver halide emulsion and associated dye developer strata may be separated from other sets by suitable interlayers, for example, by a layer or stratum of gelatin or polyvinyl alcohol. In certain instances, it may be desirable to incorporate a yellow filter in front of the green-sensitive emulsion and such yellow filter may be incorporated in an interlayer. However, where desirable, a yellow dye developer of the appropriate spectral characteristics and present in a state capable of functioning as a yellow filter may be so employed and a separate yellow filter omitted.

Particularly useful products for obtaining multicolor dye developer images are disclosed in U.S. Pat. No. 3,415,644. This patent discloses photographic products wherein a photosensitive element and an image-receiving element are maintained in fixed relationship prior to exposure, and this relationship is maintained as a laminate after processing and image formation. In these products, the final image is viewed through a transparent (support) element against a light-reflecting, i.e., white background. Photoexposure is made through said transparent element and application of the processing composition provides a layer of light-reflecting material to provide a white background. The light-reflecting material (referred to in said patent as an "opacifying agent") is preferably titanium dioxide, and it also performs an opacifying function, i.e., it is effective to mask the developed silver halide emulsions so that the transfer image may be viewed without interference therefrom, and it also acts to protect the photoexposed silver halide emulsions from postexposure fogging by light passing through said transparent layer if the photoexposed film unit is removed from the camera before image-formation is completed.

U.S. Pat. No. 3,647,437 is concerned with improvements in products and processes disclosed in said U.S. Pat. No. 3,415,644, and discloses the provision of light-absorbing materials to permit such processes to be performed, outside of the camera in which photoexposure is effected, under much more intense ambient light conditions. A light-absorbing material or reagent, preferably a pH-sensitive phthalein dye, is provided so positioned and/or constituted as not to interfere with photoexposure but so positioned between the photoexposed silver halide emulsions and the transparent support during processing after photoexposure as to absorb light which otherwise might fog the photoexposed emulsions. Furthermore, the light-absorbing material is so positioned and/or constituted after processing as not to interfere with viewing the desired image shortly after said image has been formed. In the preferred embodiments, the light-absorbing material, also sometimes referred to as an optical filter agent, is initially contained in the processing composition together with a light-reflecting material, e.g., titanium dioxide. The concentration of the light-absorbing dye is selected to provide the light transmission opacity required to perform the particular process under the selected light conditions.

In a particularly useful embodiment, the light-absorbing dye is highly colored at the pH of the processing composition, e.g., 13–14, but is substantially non-absorbing of visible light at a lower pH, e.g., less than 10–12. This pH reduction may be effected by an acid-reacting reagent appropriately positioned in the film unit, e.g., in a layer between the transparent support and the image-receiving layer.

The dye developers are preferably selected for their ability to provide colors that are useful in carrying out subtractive color photography, that is, the previously mentioned cyan, magenta and yellow. The dye developers employed may be incorporated in the respective silver halide emulsion or, in the preferred embodiment, in a separate layer behind the respective silver halide emulsion, and such a layer of dye developer may be applied by use of a coating solution containing the respective dye developer distributed, in a concentration calculated to give the desired coverage of dye developer per unit area, in a film-forming natural, or synthetic, polymer, for example, gelatin, polyvinyl alcohol, and the like, adapted to be permeated by the processing composition.

Other diffusion transfer products and processes according to the invention are the types described in U.S. Pat. Nos. 3,573,043 and 3,594,165. A particularly useful film unit according to the invention is one wherein the photosensitive element includes a light-reflecting layer between the silver halide layer and the image dye-providing layer (as described in Canadian Pat. No. 668,952), the substrate of the photosensitive element carries the polymeric acid neutralizing layer which in turn carries the timing layer (as described in U.S. Pat. No. 3,573,043) and the processing composition includes an oximated polydiacetone acrylamide thickening agent (as described in U.S. Pat. No. 4,202,694.

For convenience, the entire disclosure of each of the eight patents referred to immediately above is hereby incorporated by reference herein.

As described previously, the image dye-providing materials of the invention are not restricted to dye developers but rather may include many other types of initially diffusible and initially nondiffusible image dye-providing materials. Thus, for example, an initially diffusible coupling dye which is useful in the diffusion transfer process described in U.S. Pat. No. 3,087,817 may be provided by attaching to the chromophoric system one or more color coupling moieties such as a phenol or a naphthol having a free position para to the hydroxyl group. An example of such an image dye-providing material according to the invention is

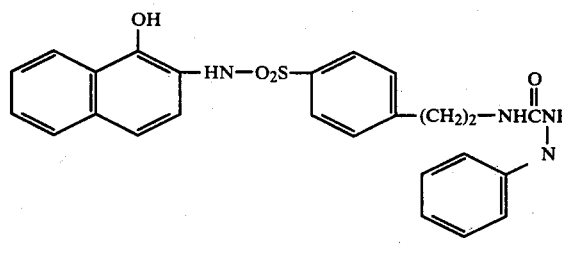
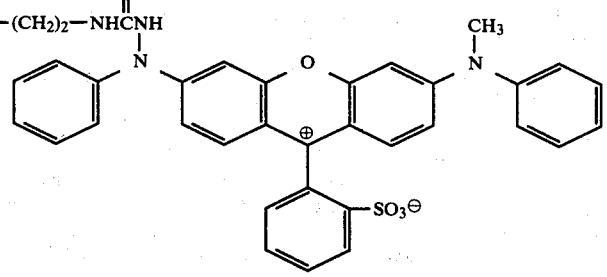

DYE XXVI

This dye is initially diffusible but is rendered nondiffusible by coupling with the oxidation product of a color developer, e.g., a p-phenylenediamine or a p-aminophenol, to form a less diffusible product. If the coupling position is substituted by a substituent which renders the dye initially nondiffusible by virtue of a ballast group and which substituent is displaceable upon coupling, such a dye may be employed to provide a diffusible dye where coupling occurs employing the principles described in U.S. Pat. No. 3,227,550.

An initially nondiffusible "redox dye releaser" image dye-providing material useful in the diffusion transfer process described in U.S. Pat. No. 4,076,529 may be provided by attaching one or more sulfonamidophenol or sulfonamidonaphthol groups to the chromophoric system. An example of such a material according to the invention is represented by the formula

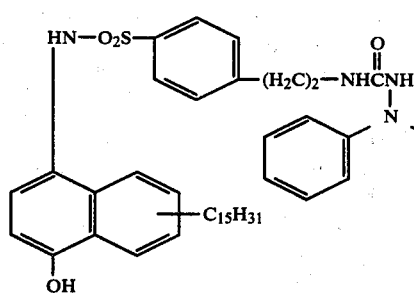
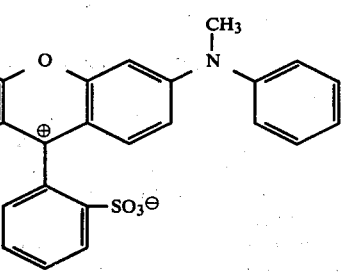

DYE XXVII

Other sulfonamidophenol and sulfonamidonaphthol groups known in the art, for example, such as those described in U.S. Pat. Nos. 4,053,312 and 4,055,428, which cleave in alkaline solution at the sulfonamido groups following oxidation may be used in place of the p-sulfonamidophenol group shown above.

Another class of initially nondiffusible image dye-providing materials (described in U.S. Pat. No. 3,443,940) release a diffusible dye following oxidation and intramolecular ring closure. An image dye-providing material of this type according to the invention is represented by the formula

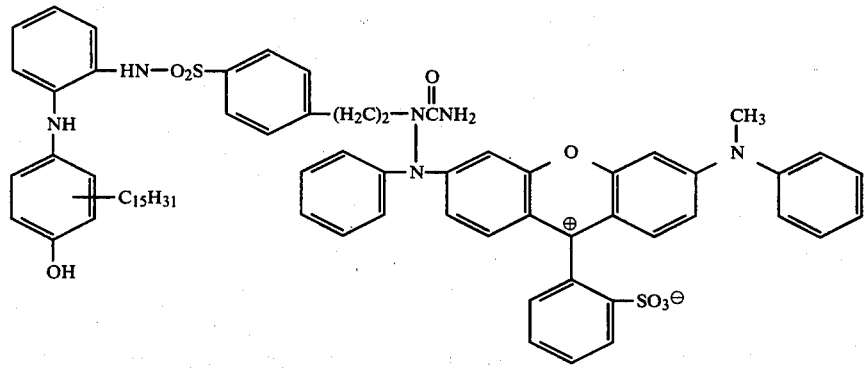

DYE XXVIII

Other image dye-providing materials which cleave in alkali following oxidation may be provided by a compound within Formula B wherein Y is —O— or —S— and the hydroquinonyl group contains a ballast group, e.g., $C_{15}H_{31}$ in accordance with the disclosure of U.S. Pat. No. 3,725,062. An example of such a compound according to the invention is represented by the formula such as, for example, a 3-pyrazolidone or a hydroquinone such as 4-methylphenylhydroquinone, which may be initially arranged in a layer of the photosensitive element or in the processing composition.

In another preferred embodiment of the invention the diffusion control moiety is a thiazolidine group whose cleavage is silver catalyzed. As described in U.S. Pat. No. 3,719,489, image dye-providing materials of this type are photographically inert in the photographic processing composition but are capable of undergoing cleavage in the presence of an imagewise distribution of silver ions and/or soluble silver complex containing silver ions made available as a function of development to liberate a reagent in an imagewise distribution corresponding to that of said silver ion and/or said complex. Dyes XIV-XIX are examples of such image dye-provid-

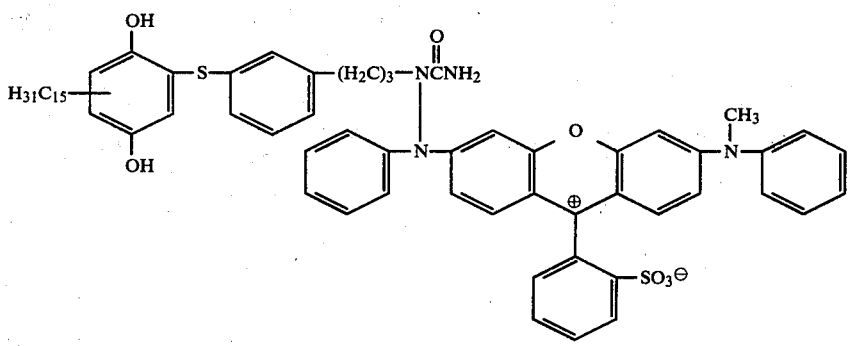

DYE XXIX

It should be understood that although the ballast group shown in the above illustrated compounds is a long chain alkyl group, other ballast groups known in the art may also be used.

In the use of a nondiffusible image dye-providing material which releases a diffusible image dye-providing material following oxidation in an alkaline environment, the requisite oxidation may be effected by the oxidation product of a mobile developing agent used to develop the photoexposed silver halide emulsion. A particularly effective developing agent for this purpose is 1-phenyl-4,4-dimethyl-3-pyrazolidone; other suitable developing agents are known in the art.

Development is advantageously effected in the presence of an onium compound, particularly a quaternary ammonium compound, in accordance with the disclosure of U.S. Pat. No. 3,173,786. Quaternary ammonium compounds which form an active methylene compound in alkali are especially useful.

Development may be effected in the presence of a colorless auxiliary or accelerating developing agent ing materials according to the invention.

The invention will now be described further in detail with respect to specific preferred embodiments by way of examples, it being understood that these are illustrative only and the invention is not intended to be limited to the materials, conditions, process parameters, etc., recited therein. All parts and percentages are by weight unless otherwise specified.

EXAMPLE I

A mixture of 4.05 g. (10 mmole) of a compound represented by the formula

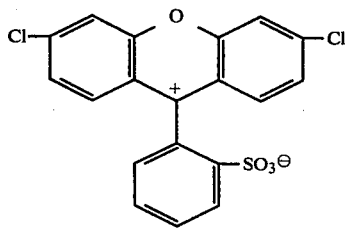

COMPOUND I and 5.70 g. (20 mmole) of a compound represented by the formula

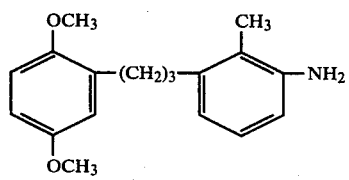

COMPOUND II in 50 ml of diglyme was heated on a steam bath for about 3½ hours. The cooled reaction mixture was poured into about 300 ml of water (sodium chloride solution was added to induce floculation), the precipitate collected by filtration and washed with water and ether and dried to give 6.08 g. of a compound represented by the formula

COMPOUND III

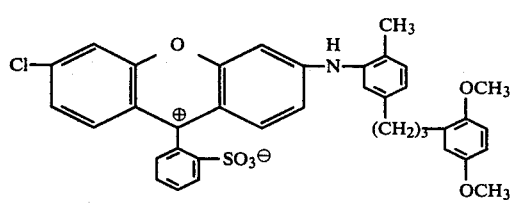

A mixture of 6.53 g (10 mmole) of compound III in 50 ml. of diglyme was treated with 1.78 (15 mmole) of potassium tertiary butoxide. Compound III gradually dissolved and the solution became dark. The solution was cooled to 0° C. and 1.42 ml (15 mmole) of dimethyl sulfate were added. The reaction mixture was stirred at 0° C. for 1 hour and at room temperature over the weekend. The reaction mixture was poured into about 700 ml of water (including some salt to encourage floculation), the precipitate collected by filtration, dissolved in methylene chloride and dried over sodium sulfate. The methylene chloride was removed and the residue recrystallized from a tetrahydrofuran-hexane mixture to give 4.41 g. of a compound represented by the formula

COMPOUND IV

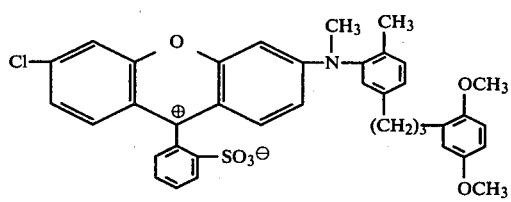

A mixture of 4.10 g. (6.0 mmole) of compound IV, 2.02 g. (13.3 mmole) of phenylsemicarbazide

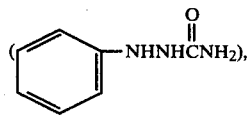

and 2.0 g. of magnesium oxide in 120 ml. of dimethylsulfoxide was heated at 130° C. for about 1½ hours. The reaction mixture was poured into 600 ml. of 5% hydrochloric acid and the precipitate collected by filtration to give the crude product which was washed with water and then purified with high performance liquid chromatography (20% V/V MeOH/80% $CH_2Cl_2$ on silica gel) to give 3.66 g. of a compound represented by the formula

COMPOUND V

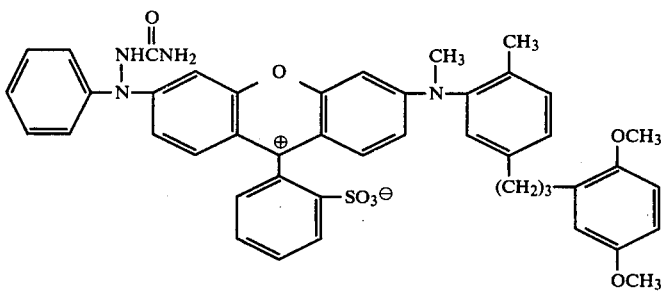

A solution of 340 mg. of compound V in about 5 ml. of methylene chloride was slowly added to a solution of excess boron tribromide in about 30 ml. of methylene chloride. The mixture was stirred for 1 hour at room temperature and an equivalent volume of ether added. The mixture was then poured into about 100 ml. of 5% sodium sulfite, stirred for 20 minutes and the suspension filtered to collect the crude dye which was dried to give 295 mg. of Dye I $\lambda_{max}$(methyl cellosolve)=544 nm, $\epsilon=74,700$.

EXAMPLE II

A solution of 100 mg. of compound V in about 5 ml. of dyglyme was treated with excess potassium tertiary butoxide for about 1 hour during which time the solution turned blue. Excess dimethyl sulfate was added to the solution and it gradually turned back to a magenta color over a ½ hour period. The reaction mixture was stirred over a weekend and then poured into a saturated sodium chloride solution. The resulting precipitate was collected by filtration, purified by preparative thin layer chromatography (10/90 V/V MeOH/$CH_2Cl_2$) to give a reddish-magenta compound.

A solution of 613 mg. (0.77 mmole) of the compound prepared above in about 10 ml. of methylene chloride was quickly added to excess boron tribromide in about 400 ml. of methylene chloride. The reaction mixture was stirred for 1 hour and about 100 ml. of a 5% NaHSO₄ solution added to it. The resulting precipitate was collected by filtration, washed with water and dried to give 361 mg. of Dye II, a purple powder, $\lambda_{max}$(methyl cellosolve)=541 nm, $\epsilon$=74,500.

The structure of the product was confirmed by IR and UV spectra.

EXAMPLE III

A mixture of 5.08 g. (7.6 mmole) of compound IV and 2.02 g. (8.4 mmole) of 1,4-diphenyl-4-methyl semicarbazide in about 80 ml. of dry pyridine was heated at 110° C. for about 50 minutes. The reaction mixture was poured into 5% hydrochloric acid and the resulting precipitate collected by filtration. Thin layer chromatography showed the crude product to be similar to a sample of crude material which had been purified by preparative thin layer chromatography (6/94 V/V MeOH/CH₂Cl₂), having the formula

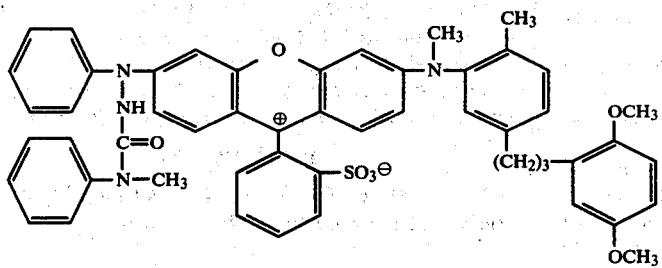

COMPOUND VI

Compound VI, the blocked precursor of Dye III, can be converted to Dye III by reaction with boron tribromide as is described in Examples I and II.

EXAMPLE IV

Crude compound VI was dissolved in 10 ml. of methanol and about 2 ml. of methyl iodide were added to the solution. An aliquot of 5% NaOH was added. The reaction mixture turned purplish and then gradually back to magenta over a period of an hour. The process was repeated until no color change could be observed. The solvent was removed and the residue and water dissolved in methylene chloride. The methylene chloride was removed to give the crude product (the methoxy-blocked precursor of Dye IV) which was purified by high performance liquid chromatography. The pure product exhibited $\lambda_{max}$=542 nm, $\epsilon$=81,100. The structure of the product was confirmed by IR, visible and UV spectra.

The blocked precursor can be converted to Dye IV by reaction with boron tribromide as is described in Examples I and II.

EXAMPLE V

A mixture of 6.675 g. (10.0 mmole) of compound IV and 3.15 g. (10.5 mmole) of a compound represented by the formula

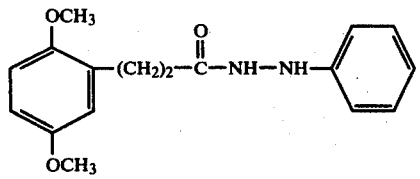

COMPOUND VII in 25 ml. of dry pyridine was heated to 130° C. for 2 hours. The resulting solution was poured into 800 ml. of 5% hydrochloric acid and the resulting precipitate collected by filtration, washed with water and dried in air to give about 9-10 g. of crude product, the methoxy-blocked precursor of Dye V. The crude product was purified by preparative thin layer chromatography to give the pure product, $\lambda_{max}$(methyl cellosolve)=541 nm, $\epsilon$=71,200.

The structure of the product was confirmed by IR and visible spectra.

The blocked precursor can be converted to Dye V by reaction with boron tribromide as described in Examples I and II.

EXAMPLE VI

The crude methoxy-blocked precursor of Dye V was dissolved in 500 ml. of methylene chloride and excess conc. KOH/methanol was added until the solution turned blue, after which 13 ml. of methyl iodide were added and the solution stirred for 1 hour. Thin layer chromatography showed the reaction to be complete. The solution was washed with water and evaporated to dryness on a rotary evaporator. Separation by high performance liquid chromatography gave 3.18 g. of pure product, the methoxy-blocked precursor of Dye VI.

A solution of 4.03 g. of the blocked material in about 25 ml. of methylene chloride was added to 6 ml. of boron tribromide in 500 ml. of methylene chloride and the reaction mixture stirred for ½ hour. To the reaction mixture there were added 250 ml. of 10% NaHSO₄ solution and the mixture was stirred for about ½ hour. The resulting precipitate was collected by filtration, suspended in 400 ml. of water and heated to about 90° C. for ½ hour. The precipitate was collected by filtration and dried to give 3.45 g. of Dye V, $\lambda_{max}$(methyl cellosolve)=545 nm, $\epsilon$=75,000.

The structure of the product was confirmed by IR and visible spectra.

EXAMPLE VII

To a solution of 20 g. of the methoxy-blocked precursor of Dye V in 400 ml. of dry dimethylformamide there were added 1.1 g. of NaH with stirring and the stirring continued until the solution turned blue (about 20 minutes). To the solution there were added 12 g. of an iodide compound represented by the formula

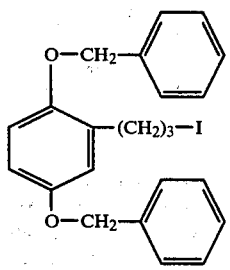

COMPOUND VIII and the reaction mixture was stirred overnight. An additional 0.4 g. of NaH and 5.7 g. of compound VIII were added and the reaction mixture again stirred overnight. The reaction mixture was poured into 3500 ml. of diethyl ether and the gummy material which precipitated was collected by filtration and oven dried. The filtrate was poured into a 5% hydrochloric acid/water solution. The resulting gummy material was collected by filtration. The gums were combined and dissolved in methylene chloride. The solvent was dried and was removed from the residue by rotary evaporation. The solid obtained was dried in an oven overnight to give 32.4 g. of crude product. The crude product was purified by chromatography to give 7.2 g. of the methoxy-blocked precursor of Dye VII.

A solution of 1.036 g. of the methoxy-blocked precursor of Dye VII in about 3 ml. of methylene chloride was added dropwise, under nitrogen, to a stirred solution of 4 ml. of boron tribromide in 4 ml. of methylene chloride and stirring was continued for ½ hour. The reaction mixture was poured into about 30 ml. of methanol containing bis-methoxyethyl hydroxylamine and 5 ml. of pyridine. The solution was then subjected to rotary evaporation, poured into 500 ml. of diluted hydrochloric acid and the precipitate collected and dried to give 950 mg. of crude product. The crude product (9.1 g.) was dissolved in methanol and 136.5 g. of sand were added to the solution. The mixture was evaporated to dryness and the residue purified by chromatography to give 7.5 g. of Dye VII, $\lambda_{max}$(methyl cellosolve)=545 nm, $\epsilon$=76,424.

EXAMPLE VIII

A mixture of 40 mg. (0.0599 mmole) of compound IV and 0.01 g. of phenylthiosemicarbazide in 0.5 ml. of dry diglyme was refluxed for 1¼ hours. The resulting precipitate was collected by filtration. Both the crystalline precipitate and the mother liquor were chromatographed on thick silica gel plates and developed in 4%, and then 6% methanol/methylene chloride. The precipitate was then collected and dried to give the methoxy-blocked precursor of Dye VIII, $\lambda_{max}$(methyl cellosolve)=544 nm, $\epsilon$=46,000. The structure of the compound was confirmed by IR and UV spectra.

The methoxy-blocked precursor of Dye VIII can be converted to Dye VIII by reaction with boron tribromide as described in other examples.

EXAMPLE IX

A mixture of 40 mg. of compound I and 32 mg. of compound VII in about 0.5 ml. of dry pyridine were allowed to stand in a test tube at room temperature for 15 minutes. Thin layer chromatography showed the reaction to be complete. The resulting precipitate was collected and purified by dissolving it in methylene chloride, placing the solution on a silica column and washing with a 3/97 (V/V) mixture of methanol and methylene chloride. The residue was collected and dried to give the methoxy-blocked precursor of Dye IX, $\lambda_{max}$(methyl cellosolve)=510 nm, $\epsilon$=9,000.

The methoxy-blocked precursor of Dye IX can be converted to Dye IX by reaction with boron tribromide as described in other examples.

EXAMPLE X

A mixture of 4 g. (0.01 mole) of compound I, 12 g. (0.04 mole) of compound VII and 2 g. (0.02 mole) of potassium acetate in 40 ml. of diglyme was heated on a steam bath for about 4 hours. Thin layer chromatography (90/10 V/V chloroform/methanol) showed the reaction to be virtually complete. The magenta solution was filtered and the filtrate was poured over a slurry of crushed ice and dilute hydrochloric acid. The precipitate was recovered by filtration and dried to give about 8.4 g. of the crude methoxy-blocked precursor of Dye X.

The crude product was purified to give the pure methoxy-blocked precursor of Dye X, $\lambda_{max}$(methyl cellosolve)=536 nm, $\epsilon$=70,000.

The precursor can be converted to Dye X by reaction with boron tribromide as described in other examples.

EXAMPLE XI

To a mixture of 1.28 g. of Dye VI and 2.15 g. of a compound represented by the formula

COMPOUND IX in 40 ml. of methylene chloride there was gradually added diisopropylethyl amine. Additional compound IX and amine were added. The reaction mixture was extracted with 40 ml. of 5% hydrochloric acid. The methylene chloride layer was dried and the residue subjected to high performance liquid chromatography to give pure Dye XI.

EXAMPLE XII

To a suspension of 8.89 g. (10 mmole) of Dye VI and 11.6 g. of a compound represented by the formula

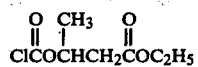

COMPOUND X in 200 ml. of methylene chloride there were slowly added 10.4 ml. of diisopropylethylamine. The mixture was stirred until the reaction was indicated as being complete by thin layer chromatography. An additional approximately 6 g. of compound X and about 4 ml. of the amine were added to the reaction mixture and stirring was continued for about 20 hours. Additional amounts of amine and compound X were added and stirring continued for an additional 24 hours. The methylene chloride was extracted with 5% hydrochloric acid and then dried over sodium sulfate. The residue was purified with high performance liquid chromatography to give 9.77 g. of Dye XII.

EXAMPLE XIII

Pyridine was added to a mixture of a small amount of Dye VI and an excess of a compound represented by the formula

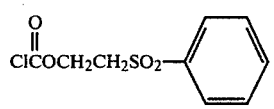
COMPOUND XI and the mixture was warmed slightly. The reaction was shown to be complete in about 15 minutes by thin layer chromatography. The reaction mixture was poured into ether and the resulting purple powder was collected by filtration, dried and purified to give Dye XIII.

EXAMPLE XIV

To a stirred suspension 2.2 g. (3.46 mmole) of a compound represented by the formula

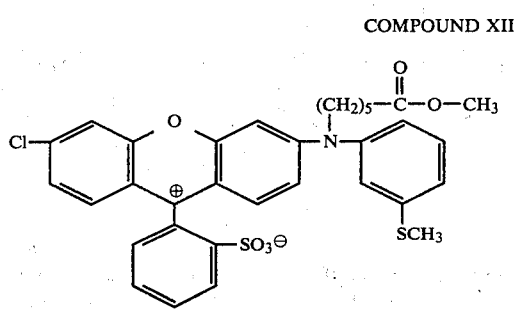
COMPOUND XII in 9 ml. of dimethylsulfoxide there were added 520 mg. of N-acetyl-N'-phenylhydrazine followed by 139 mg. of magnesium oxide. The mixture was stirred and heated in a 150° C. oil bath under nitrogen for 85 minutes, cooled to room temperature and poured into a slurry of ice and 1 N hydrochloric acid. The resulting solid was collected by filtration, washed with water and pressed dry. The solid was dissolved in chloroform, dried over sodium sulfate, evaporated to dryness on a rotary evaporator and dried under high vacuum to give a crude magenta solid.

The magenta solid (2.6 g., 3.5 mmole) was dissolved in 25 ml. of dimethylformamide along with 5.84 g. (30 mmole) of ethyl bromobutyrate and 4.83 g. (35 mmole) of finely ground anhydrous potassium carbonate. The solution was stirred and heated in a 100° C. oil bath under nitrogen for 1¼ hours, cooled, diluted with chloroform and washed with 1 N hydrochloric acid and saline solution. The solution was then dried over sodium sulfate. The organic solution was then evaporated on a rotary evaporator and the residue dried under vacuum, triturated with petroleum ether and purified by column chromatography with chloroform as the eluent to give 1.85 g. of pure magenta product, a xanthene diester sulfide.

The xanthene diester sulfide (1.85 g., 2.144 mmole) was dissolved in 24 ml. of glacial acetic acid and 1.34 g. of 40% (w/w) peracetic acid in acetic acid (7.07 mmole, 3.3 equiv.) were added. After 1 hour 10 minutes the mixture was poured into water and saturated aqueous sodium bicarbonate solution was added slowly until the acid was neutralized. The mixture was then extracted with chloroform. The organic extract was washed with water, dried, and evaporated under vacuum to give 2.145 g. (2.4 mmole) of a xanthene diester sulfone.

The xanthene diester sulfone (2.14 g., 2.4 mmole) was dissolved in 20 ml. of p-dioxane and to the solution there were added 9.6 ml. of 1 N NaOH (9.6 mmole, 4 equiv.). The resulting solution was stirred at room temperature for 1.5 hours and then poured into crushed ice slurried with 1 N HCl. The solid precipitate was collected by filtration, washed with water and then dissolved in tetrahydrofuran. This solution was evaporated to dryness under vacuum and the residue dried under high vacuum to give, as a powder, 1.5 g. (1.76 mmole) of xanthene diacid sulfone represented by the formula

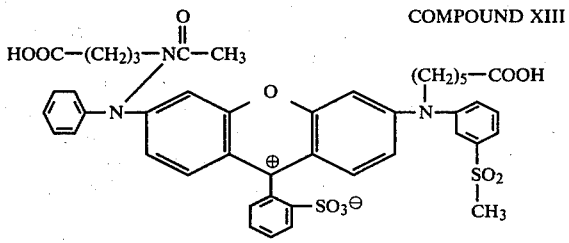
COMPOUND XIII

To 1.5 g. (1.76 mmole) of the compound there were added 20.72 ml. of a 99.4 mg./ml. (0.17 mmole/mg.) methylene chloride solution of aminothiazolidine (2.06 g., 3.52 mmole) represented by the formula

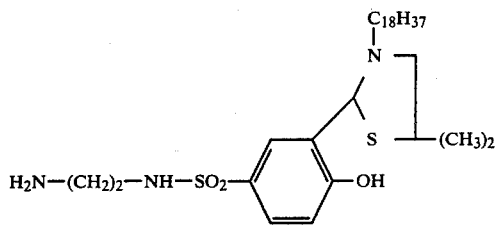

and the solvent then removed under vacuum. To the residue there were added 15 ml. of dimethylformamide and 355 mg. (3.52 mmole) of triethylamine and the mixture stirred and cooled to −25° C. under nitrogen. A solution of 968 mg. (3.52 mmole) of diphenylphosphoryl azide in 5 ml. of dimethylformamide was added in one portion. The resulting mixture was stirred under nitrogen at about −25° C. to −20° C. for 2 hours and then allowed to warm to room temperature overnight with stirring. The reaction mixture was then poured into a slurry of 1 N hydrochloric acid and ice and the resulting precipitate collected by filtration and washed with water. The solid was redissolved in chloroform, dried over sodium sulfate and evaporated to dryness leaving a solid that was purified by column chromatography to give 860 mg. of Dye XIV. The structure of the product was confirmed by proton NMR and visible spectra.

EXAMPLE XV

Exactly 390 mg. (0.535 mmole) of a xanthene diacid represented by the formula

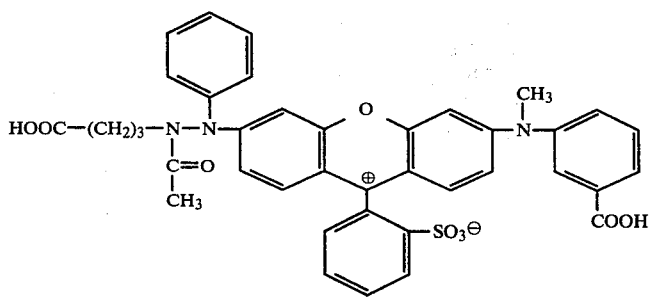

were combined with 625 mg. (1.07 mmole) of aminothiazolidine and 108 mg. (1.07 mmole) of triethylamine in 9 ml. of dry dimethylformamide and stirred under nitrogen while cooling in a −25° C. bath. A solution of 295 mg. (1.07 mmole) of diphenylphosphoryl azide in 1 ml. of dimethylformamide was added to the mixture which was then stirred at −25° C. for 1 hour and allowed to warm slowly. After 19 hours the reaction mixture was added to a slurry of 1 N hydrochloric acid and ice and the resulting solid collected by filtration, washed with water, redissolved in chloroform, dried over sodium sulfate and evaporated under vacuum to dryness. The product was purified by column chromatography to give 460 mg. of Dye XV.

The structure of the compound was confirmed by proton NMR and visible spectra.

EXAMPLE XVI

Exactly 900 mg. (1.09 mmole) of a xanthene diacid represented by the formula

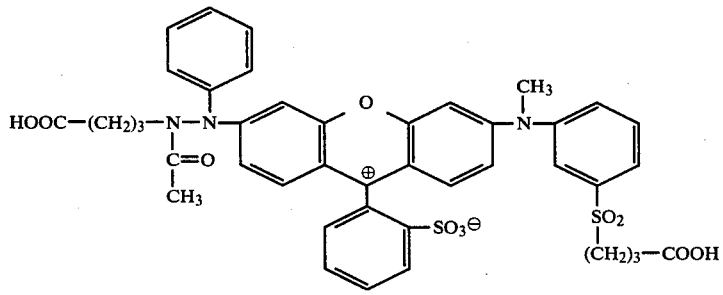

were mixed with 1.27 g. (2.18 mmole) of aminothiazolidine and 220 mg. (2.18 mmole) of triethylamine in 10 ml. of dry dimethylformamide. The mixture was stirred under nitrogen while cooling in a −25° C. bath. A solution of 601 mg. (2.18 mmole) of diphenylphosphoryl azide in 2 ml. of dimethylformamide was added to the mixture in one portion. The resulting mixture was stirred for 1 hour in the −25° C. bath, then allowed to warm slowly toward room temperature. After 21 hours, the reaction mixture was poured into a slurry of 1 N hydrochloric acid and ice and the resulting solid collected by filtration, washed with water, redissolved in chloroform, dried over sodium sulfate, evaporated to dryness and purified by column chromatography to give 500 mg. of Dye XVI. $\lambda_{max}$(methyl cellosolve)=548 nm, $\epsilon$=79,300.

The structure of the product was confirmed by proton NMR and visible spectra.

EXAMPLE XVII

To a solution of 676 mg. (0.886 mole) of a compound represented by the formula

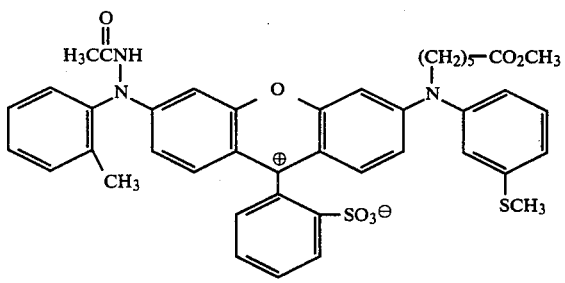

and 1.086 ml. (1.48 g., 7.59 mmole) of ethylbromobutyrate in 7 ml. of dimethylformamide there were added 1.223 g. (8.86 mmole) of anhydrous, finely divided $K_2CO_3$. The mixture was stirred under argon and heated for 2½ hours in a 100° C. bath. The cooled reaction mixture was diluted with chloroform and washed with 1 N hydrochloric acid. The organic phase was dried over sodium sulfate and then subjected to rotary evaporation to give a liquid magenta residue. The residue was then subjected to high vacuum overnight to remove excess halide. The residue was triturated twice with hexane to give a crude xanthene diester sulfide represented by the formula

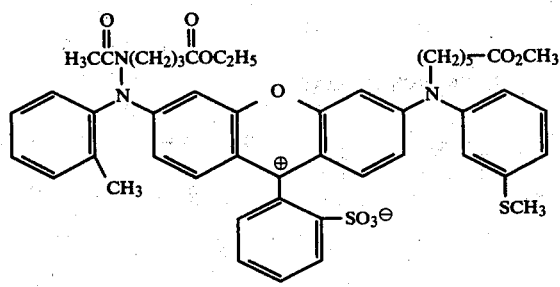
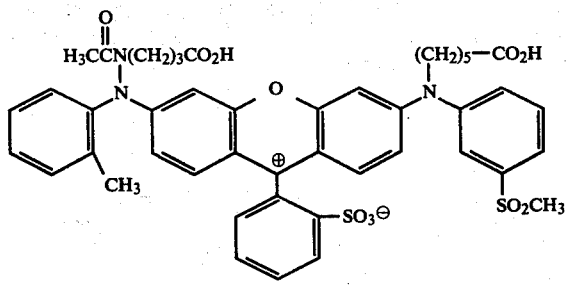

The crude product was purified by column chromatography.

The xanthene diester sulfide (308 mg., 0.351 mmole) was dissolved in 4 ml. of glacial acetic acid. To this solution there were added, dropwise from a syringe at room temperature, 220.2 mg. (1.159 mmole), diluted with about 0.5 ml. of acetic acid, of a solution of 40% w/w of peracetic acid in acetic acid. The reaction mixture was stirred at room temperature under argon for 3¼ hours, poured carefully into saturated sodium bicarbonate solution and stirred until vigorous foaming had subsided. Methylene chloride and additional sodium bicarbonate were added and the mixture stirred for 2 hours. The organic phase was separated, washed with sodium bicarbonate, dried over sodium sulfate and the solvent removed by rotary evaporation to give 294 mg. of a bis ester compound represented by the formula

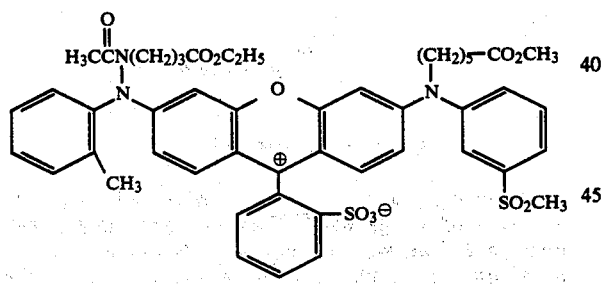

The bis ester compound (294 mg., 0.323 mmole) was dissolved in 6 ml. of dry p-dioxane and 0.65 ml. of 1 N aqueous sodium hydroxide was added with stirring. The resulting mixture was stirred for 2 hours under argon. Additional sodium hydroxide (0.65 ml.) was added and stirring continued for 1 hour. Another 0.65 ml. of sodium hydroxide was added and stirring continued for 50 minutes. The mixture was poured into an ice-1 N HCl mixture and the precipitate collected by filtration. The filtrate was extracted twice with methylene chloride. The solid was dissolved in methylene chloride containing some methanol and the combined solutions were dried over sodium sulfate. The solvent was removed by rotary evaporation to give 236 mg. of a purple solid represented by the formula Exactly 367 mg. (0.544 mmole) of aminothiazolidine hydrochloride were partitioned between ethyl acetate/aqueous sodium bicarbonate and removal of ethyl acetate left the free base as an oil. The oil was combined with 236 mg. (0.272 mmole) of the purple diacid and 75 μl (55 mg., 0.5444 mmole) of triethylamine in 3 ml. of dimethylformamide. The resulting solution was cooled under argon in a −30° C. bath and 117.5 (150 mg., 0.544 mmole) of diphenyl phosphoryl azide were added. The resulting mixture was stirred for 69 hours. The mixture was diluted with ethyl acetate, washed twice with 1 N HCl and twice with saturated aqueous sodium bicarbonate and dried over sodium sulfate. The solvent was removed by rotary evaporation to give crude Dye XVII. The crude product was purified by column chromatography on silica gel to give 120 mg. of Dye XVII, $\lambda_{max}=545$ nm, $\epsilon=99,500$.

EXAMPLE XVIII

Exactly 1.502 g. (10 mmole) of a hydrazide compound represented by the formula

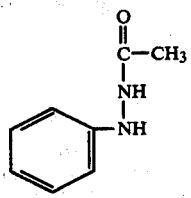

and 5.035 g. (10 mmole) of a chloroxanthene compound represented by the formula

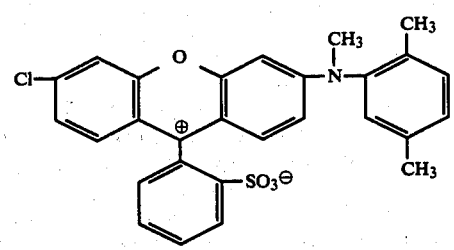

along with 0.4 g. (10 mmole) of MgO were combined together in 22 ml. of dimethylsulfoxide and heated with stirring under a CaSO₄ tube in a 140° C. oil bath. After 2 hours 15 minutes the reaction mixture was cooled to room temperature and poured into a 1 N HCl-ice mixture. The resulting suspension was cooled in an ice bath (about 20 minutes) and the precipitate collected by filtration. The precipitate was washed with 1 N HCl. The filter cake was dissolved in methylene chloride and transferred to a separating funnel. The organic phase was isolated from the small lighter aqueous phase and the organic phase was evaporated to dryness under rotary evaporation. The residue was dried under high vacuum to give 5.89 g. of a crude compound represented by the formula

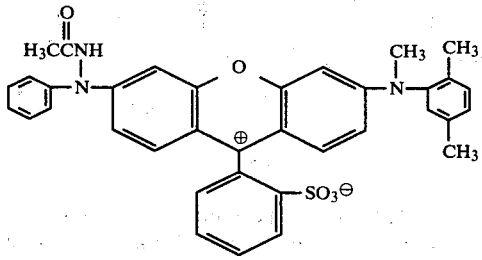

The crude compound (5.89 g., 9.55 mmole) was dissolved in 60 ml. of dry tetrahydrofuran and ethyl bromo butyrate (11.6 ml., 15.8 g., 81.2 mmole) and finely ground anhydrous K₂CO₃ (13.18 g., 95.5 mmole) were added. The mixture, under a CaSO₄ tube, was heated with stirring in a 100°–105° C. oil bath for 3 hours. The cooled reaction mixture was poured into a 1 N HCl-ice mixture and then extracted with methylene chloride. The organic phase was washed with water, dried over sodium sulfate and evaporated to dryness leaving a liquidy residue. The residue was dried under high vacuum overnight to give a syrup which was triturated with hexane and dried again under vacuum. The residue was subjected to column chromatography on Al₂O₃ eluting with methylene chloride. The pure product was then collected and dried under high vacuum overnight. The residue was suspended in ethyl ether, collected by filtration and dried under vacuum to yield 3.46 g. of a dark greenish solid xanthene ester represented by the formula

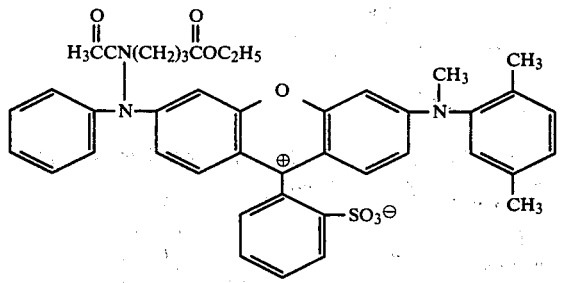

The xanthene ester (2.625 g., 3.59 mmole) was dissolved in 29 ml. of absolute methanol and 11 ml. of 1 N NaOH were added dropwise over a one minute period. The solution was stirred under argon for 5½ hours and then poured into a 1 N HCl-ice mixture. The resulting precipitate was collected by filtration, washed with 1 N HCl and water and dried in air overnight. The residue was dissolved in about 250 ml. of saturated aqueous NaHCO₃ and washed thoroughly with ethyl acetate. The aqueous phase was then layered with methylene chloride and 2 N HCl (about 150 ml.) was added dropwise with stirring to acidify to about pH 2. The methylene chloride layer was isolated and washed with 1 N HCl and then water and dried over sodium sulfate. The solvent was removed by rotary evaporation leaving a solid which was suspended in ethyl ether, collected by filtration, washed with ethyl ether and dried under vacuum to give 2.1597 g. of a magenta solid represented by the formula

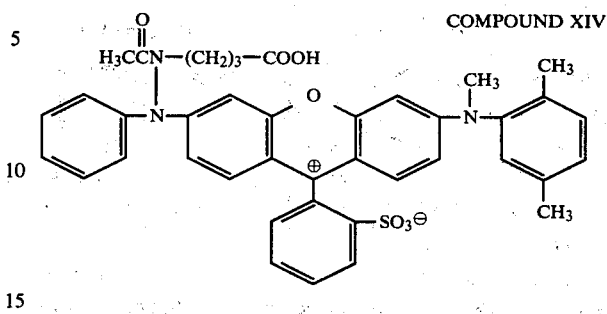

L-glutaric acid (11 g., 75 mmole) was dissolved in water (150 ml.) with 1 N NaOH (160 ml.) and ethyl ether (150 ml.) was added. The two phase mixture was stirred vigorously in an ice-salt bath and to it there was added, dropwise and at the same time (from two dropping funnels), 100 ml. of 1 N NaOH and a solution of β,β,β-trichloroethylchloroformate in 100 ml. of dioxane. The resulting mixture was stirred for 100 minutes and then washed with 500 ml. of diethyl ether. The aqueous phase was layered with ethyl acetate, stirred and acidified with 2 N HCl. The organic phase was isolated. The aqueous phase was extracted with ethyl acetate. The combined organic phases were washed with a saturated salt solution, dried over sodium sulfate and the solvent removed by rotary evaporation to leave a thick colorless syrup which was dried under high vacuum overnight. The syrup was dissolved in diethyl ether, washed ten times with 100 ml. portions of water and dried over sodium sulfate. The solvent was removed by rotary evaporation and the residue was dried under high vacuum to give 21 g. of a thick, clear, colorless syrup represented by the formula

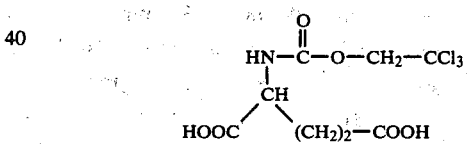

The diacid urethane (14.8 g., 0.0459 mole) was dissolved in 450 ml. of dry dimethylformamide and 28 ml. of triethylamine were added followed by 61.9 g. (0.0918 mole) of a thiazolidine compound represented by the formula

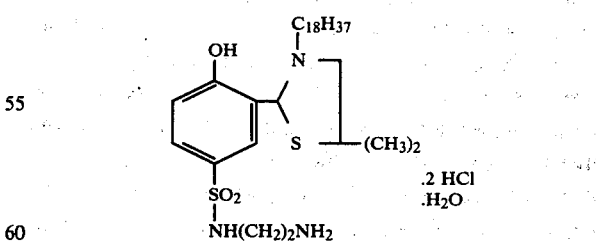

The mixture was stirred under argon and cooled in a −30° C. methanol-ice-dry ice bath. After 15 minutes diphenyl phosphoryl azide (19.79 ml.) was added. The resulting mixture was stirred for 1½ hours at −20° C. to −25° C. and then stirred overnight with the bath temperature being allowed to rise toward room temperature. After a total of 20 hours the mixture was diluted with ethyl acetate, washed three times with 1 N HCl and then twice with saturated aqueous sodium bicarbonate. The organic phase was dried over sodium sulfate and the solvent was removed by rotary evaporation. The desired product (38 g.) was separated from contaminants by column chromatography (with silica gel) eluting with 2.5%/97.5%(V/V)methanol-methylene chloride. The product (12 g.) was further purified by column chromatography eluting with 2%/98%(V/V)methanol/methylene chloride to give 7.59 g. of a pure thiazolidine compound represented by the formula

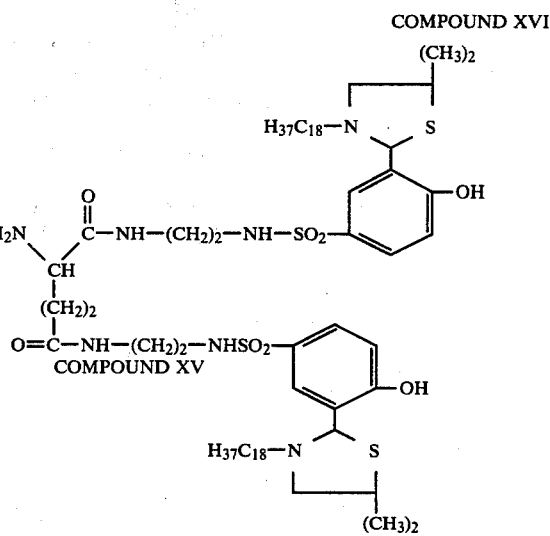

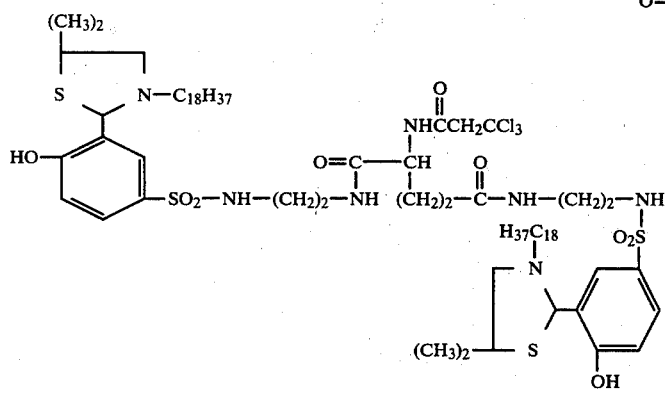

Compound XV (7.59 g., 5.225 mole) was dissolved in 80 ml. of glacial acetic acid under argon and 8.2 g. of zinc dust added in portions over a period of one minute. The resulting mixture was stirred under argon for 3 hours 20 minutes and then diluted with ethyl acetate and filtered through diatomaceous earth. Water was added to the filtrate and the mixture was stirred as sodium bicarbonate was added to neutralize the acetic acid. The organic layer was isolated and the aqueous phase was washed with ethyl acetate. The combined organic phases were washed with saturated sodium bicarbonate solution, then dried and the solvent removed by rotary evaporation to give a crude white residue. The residue was purified by column chromatography on $SiO_2$ eluting with 3/97 (V/V) methanol/methylene chloride to elute off contaminants and then with 6/94 (V/V) methanol/methylene chloride to give 3.6647 g. of an amino bis thiazolidine compound represented by the formula To a stirred solution of compound XIV (2.0169 g., 2.869 mmole) and compound XVI (3.6647 g., 2.869 mmole) in 40 ml. of dry dimethylformamide, there was added triethylamine (0.4 ml., 2.869 mmole) and the solution cooled under argon in a $-30°$ C. bath. After 15 minutes diphenyl phosphoryl azide (0.62 ml., 2.869 mmole) was added dropwise with a syringe over a period of about 20 seconds. The resulting mixture was stirred in a cold bath under argon for 1½ hours. The mixture was then stirred overnight with the bath being allowed to rise toward room temperature. The reaction mixture was diluted with methylene chloride, washed thoroughly with 1 N HCl and dried over sodium sulfate. The solvent was removed by rotary evaporation and the residue dried under high vacuum. The compound was purified by silica gel column chromatography eluting with 3/97 (V/V) methanol-methylene chloride which was gradually changed to 4/96 (V/V) methanol-methylene chloride affording a solid which was suspended in a 2:1 (V/V) hexaneether solution, filtered and vacuum dried to give 3.564 g. of Dye XIX, $\lambda max = 548$ nm, $\epsilon = 79,560$.

$C_{107}H_{154}N_{10}O_{14}S_5$ requires 65.41% C, 7.90% H, 7.13% N and 8.16% S. Elemental analysis found 65.03% C, 7.78% H, 6.81% N and 8.02% S.

The structure of the compound was confirmed by proton NMR.

EXAMPLE XIX

A film unit according to the invention was prepared wherein the negative element comprised an opaque subcoated polyester photographic film base having the following layers coated thereon in succession:

1. a layer of sodium cellulose sulfate coated at a coverage of about 10 mgs./m$^2$;
2. a cyan dye developer comprising about 747 mgs./m$^2$ of a cyan dye developer represented by the formula

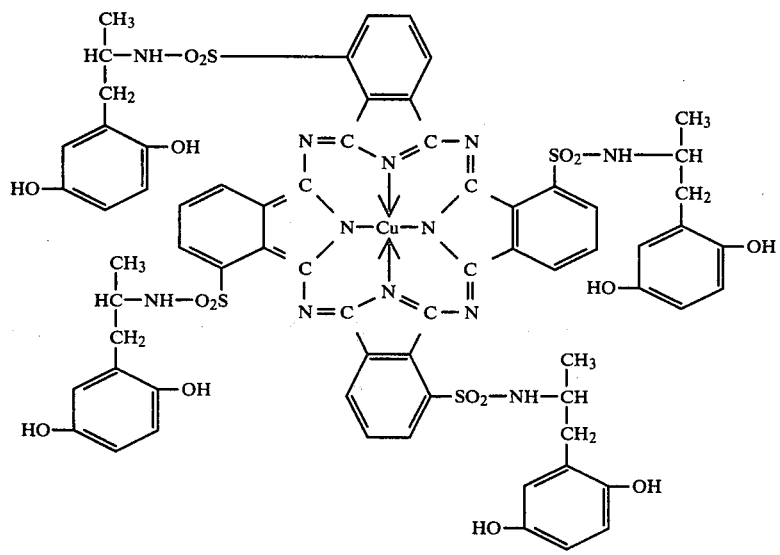

about 432 mgs./m$^2$ of gelatin, about 270 mgs./m$^2$ of 2-phenylbenzimidazole and about 67.8 mgs./m$^2$ of 4′ methyl phenyl hydroquinone (MPHQ);

3. a red sensitive gelatino silver iodobromide emulsion layer coated at a coverage of about 640 mgs./m$^2$ of silver (1.05 microns), about 640 mgs./m$^2$ of silver (1.8 microns) and about 768 mgs./m$^2$ of gelatin;
4. an interlayer coated at a coverage of about 2582 mgs./m$^2$ and comprising 97 parts of a 60-29-6-4-0.4 pentapolymer of butylacrylate, diacetone acrylamide, methacrylic acid, styrene and acrylic acid and 3 parts of polyacrylamide;
5. a magenta dye developer layer coated at a coverage of about 646 mgs./m$^2$ of Dye I, about 323 mgs./m$^2$ of gelatin and about 150 mgs./m$^2$ of 2-phenylbenzimidazole;
6. a green sensitive gelatino silver iodobromide emulsion layer coated at a coverage of about 435 mgs./m$^2$ of silver (1.05 microns), about 435 mgs./m$^2$ of silver (1.8 microns), about 382 mgs./m$^2$ of gelatin and about 1528 mgs./m$^2$ of polymethylmethacrylate;
7. a spacer layer coated at a coverage of about 215 mg./m$^2$ of gelatin;
8. an interlayer coated at a coverage of about 872 mgs./m$^2$ of 94 parts of the pentapolymer described in layer 4 and 6 parts of polyacrylamide; and about 70.5 mgs./m$^2$ of succinaldehyde;
9. a yellow dye developer layer coated at a coverage of about 968 mgs./m$^2$ of a yellow dye developer represented by the formula

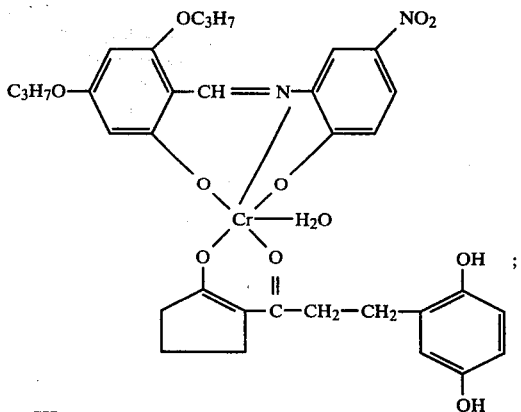

about 450 mgs./m$^2$ of gelatin and about 207 mgs./m$^2$ of 2-phenylbenzimidazole;

10. a blue sensitive gelatino silver iodobromide emulsion layer coated at a coverage of about 640 mgs./m$^2$ of silver (1.05 microns), about 640 mgs./m$^2$ of silver (1.8 microns), about 654 mgs./m$^2$ of gelatin and about 204 mgs./m$^2$ of MPHQ; and
11. a top coat layer of about 484 mgs./m$^2$ of gelatin and about 42 mgs./m$^2$ of carbon black.

The image-receiving element comprised a transparent subcoated polyethylene terephthalate base on which the following layers were coated in succession:

1. as a polymeric acid layer approximately 9 parts of a ½ butyl ester of polyethylene/maleic anhydride copolymer and 1 part of polyvinyl butyral coated at a coverage of about 26,372 mgs./m$^2$;
2. a timing layer comprising about mgs./m$^2$ of the pentapolymer described in the negative above; and
3. a polymeric image receiving layer of: (a) 3 parts of a mixture of 2 parts polyvinyl alcohol and 1 part poly-4-vinyl pyridine and (b) 1 part of a graft copolymer comprised of 4-vinylpyridine (4VP) and vinylbenzyl trimethyl ammonium chloride (TMQ) grafted onto hydroxyethyl cellulose (HEC) at a ratio of HEC/4VP/TMQ of 2.2/2.2/1 coated at a coverage of about 3229 mgs./m$^2$.

The film unit was processed with a processing composition comprised of:

|  | GMS/100cc H₂O |
|---|---|
| Water | 100cc |
| Titanium Dioxide | 76.9 |
| Carboxymethyl hydroxyethyl cellulose | 4.06 |
| Potassium hydroxide | 10.1 |
| N—Hydroxyethyl-N,N',N'—tris-carboxymethyl ethylene diamine | 1.52 |
| Polyethylene glycol | 0.91 |
| Benzotriazole | 1.12 |
| 4-aminopyrazolo-(3,4d) pyrimidine | 0.51 |
| 2-(benzimidazolyl methyl) sulfide | 0.04 |
| 6-methyl uracil | 0.61 |
| Colloidal silica | 1.12 |
| N—phenethyl-α-picolinium bromide | 2.58 |
| [structure 1] | 0.61 |
| [structure 2] | 2.71 |

The film unit was then exposed (2 meter-candle-seconds) on a sensitometer to a test exposure scale, or step wedge, through a 0.6 neutral density filter and passed through a pair of rollers at a gap spacing of about 0.0030 inch. The film unit was kept intact and viewed through the base. A well developed dye image was obtained. The reflection densities of the neutral areas of the image were:

|  | Red | Green | Blue |
|---|---|---|---|
| $D_{max}$ | 2.28 | 2.54 | 2.08 |
| $D_{min}$ | 0.20 | 0.22 | 0.21 |

EXAMPLE XX

A film unit according to the invention was prepared wherein the negative element comprised an opaque subcoated polyester photographic film base having the following layers coated thereon in succession;

1. a layer of sodium cellulose sulfate coated at a coverage of about 10 mgs./m²;
2. a cyan dye developer layer comprising about 747 mgs./m² of the cyan dye developer shown in Example XVIII, about 1554 mgs./m² of gelatin, about 270 mgs./m² of 2-phenylbenzimidazole and about 67.8 mgs./m² of MPHQ;
3. a red sensitive gelatino silver iodobromide emulsion layer coated at a coverage of about 1280 mgs./m² of silver (1.8 microns) and about 768 mgs./m² of gelatin;
4. an interlayer as described in layer 4 of the negative in Example XVIII;
5. a magenta dye developer layer coated at a coverage of about 646 mgs./m² of Dye VI, about 323 mgs./m² of gelatin and about 230 mgs./m² of 2-phenylbenzimidazole;
6. a green sensitive gelatino silver iodobromide emulsion layer coated at a coverage of about 913 mgs./m² of silver (1.8 microns) and about 438 mgs./m² of gelatin;
7. a layer comprising about 215 mgs./m² of gelatin and about 215 mgs./m² of aminoreductone;
8. an interlayer coated at a coverage of about 1453 mgs./m² of 94 parts of the pentapolymer described in Example XVIII and 6 parts of polyacrylamide; and about 70.5 mgs./m² of succinaldehyde;
9. a yellow dye developer layer as described in layer 9 of the negative in Example XVIII;
10. a blue sensitive gelatino silver iodobromide emulsion layer coated at a coverage of about 1280 mgs./m² of silver (1.8 microns), about 653 mgs./m² of gelatin and about 204 mgs./m² of MPHQ; and
11. a top coat layer of about 485 mgs./m² of gelatin and about 21 mgs./m² of carbon black.

The image-receiving element and the processing composition were the same as those described in Example XVIII, and the film unit was processed in the same manner as described therein.

A well developed dye image was obtained. The reflection densities of the neutral areas of the image were:

|  | Red | Green | Blue |
|---|---|---|---|
| $D_{max}$ | 2.14 | 2.42 | 2.21 |
| $D_{min}$ | 0.22 | 0.22 | 0.21 |

Although the invention has been described with respect to specific preferred embodiments, it is not intended to be limited thereto but rather those skilled in the art will recognize that variations and modifications may be made therein which are within the spirit of the invention and the scope of the appended claims.

What is claimed is:
1. A diffusion transfer process comprising:
   (a) imagewise exposing a photosensitive element including a silver halide emulsion and an image dye-providing material containing at least one diffusion control moiety which is capable of providing a diffusible image dye containing the chromophoric system represented by the formula

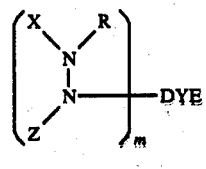

wherein X is

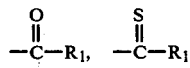

or —SO$_2$—R$_1$; Z is H, alkyl or aryl; R is H, alkyl or aryl; provided that Z and R are not both H; DYE is a dye moiety; R$_1$ is H, alkyl, aryl, NH$_2$, —NHR$_2$,

or —OR R$_2$ is H, alkyl or aryl; and m is 1 or 2;

(b) developing said exposed photosensitive element with an aqueous alkaline processing composition;

(c) forming an imagewise distribution of said diffusible image dye from said image dye-providing material as a function of development; and (d) transferring at least a portion of said imagewise distribution of said diffusible image dye to an image receiving layer arranged in superposed relationship with said silver halide emulsion to provide a diffusion transfer dye image.

2. The diffusion transfer color process as defined in claim 1 wherein said image dye-providing material is a compound represented by the formula

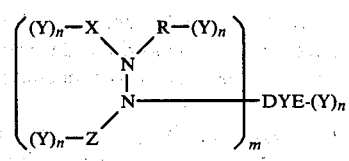

wherein each Y is a substituent including at least one diffusion control moiety and each n is 0 or 1 provided that at least one n is 1.

3. The diffusion transfer color process as defined in claim 2 wherein said image dye-providing material is a dye developer, said diffusion control moiety being a silver halide developing moiety.

4. The diffusion transfer color process as defined in claim 3 wherein said diffusion control substituent Y is the group —E—Dev wherein Dev is a hydroquinonyl group and E is a covalent bond or a divalent linking group.

5. The diffusion transfer color process as defined in claim 2 wherein said photosensitive element comprises a red sensitive silver halide emulsion associated with a cyan dye developer, a green sensitive silver halide emulsion associated with a magenta dye developer and a blue sensitive silver halide emulsion associated with a yellow dye developer, and said diffusion transfer image is a multicolor image.

6. The diffusion transfer color process as defined in claim 2 wherein said diffusion control moiety is a color coupling moiety.

7. The diffusion transfer color process as defined in claim 6 wherein said image dye-providing material is diffusible in said aqueous alkaline processing composition.

8. The diffusion transfer color process as defined in claim 6 wherein said image dye-providing material is nondiffusible in said aqueous alkaline processing composition.

9. The diffusion transfer color process as defined in claim 2 wherein said image dye-providing material is nondiffusible in said aqueous alkaline processing composition and said diffusion control moiety is a sulfonamidophenol group.

10. The diffusion transfer color process as defined in claim 2 wherein said image dye-providing material is non-diffusible in said aqueous alkaline processing composition and said diffusion control moiety is a thiazolidine group.

11. A photosensitive element comprising a support, a silver halide emulsion in a layer carried by said support and an image dye-providing material in a layer carried by said support on the same side thereof as said silver halide emulsion, said image dye-providing material containing at least one diffusion control moiety which is capable of providing a diffusible image dye containing the chromophoric system represented by the formula

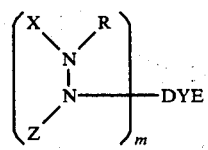

wherein X is

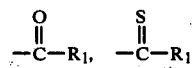

or —SO$_2$—R$_1$; Z is H, alkyl or aryl, R is H, alkyl or aryl; provided that Z and R are not both H; DYE is a dye moiety; R$_1$ is H, alkyl, aryl —NH$_2$, —NHR$_2$,

or —OR$_2$; R$_2$ is H, alkyl or aryl; and m is 1 or 2.

12. The photosensitive element as defined in claim 11 wherein said image dye-providing material is a compound represented by the formula

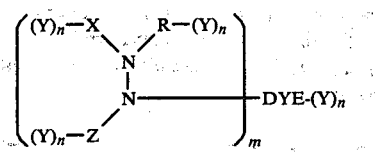

wherein each Y is a substituent including at least one diffusion control moiety and each n is 0 or 1 provided that at least one n is 1.

13. The photosensitive element as defined in claim 12 wherein said image dye-providing material is a dye developer, said diffusion control moiety being a silver halide developing moiety.

14. The photosensitive element as defined in claim 13 wherein said diffusion control substituent Y is the group —E—Dev wherein Dev is a hydroquinonyl group and E is a covalent bond or a divalent linking group.

15. The photosensitive element as defined in claim 12 including a red sensitive silver halide emulsion layer associated with a cyan dye developer layer, a green sensitive silver halide emulsion layer associated with a magenta dye developer layer and a blue sensitive silver halide emulsion layer associated with a yellow dye developer layer.

16. The photosensitive element as defined in claim 12 wherein said diffusion control moiety is a color coupling group.

17. The photosensitive element as defined in claim 12 wherein said diffusion control moiety is a sulfonamidophenol group.

18. The photosensitive element as defined in claim 12 wherein said diffusion control moiety is a thiazolidine group.

19. A diffusion transfer color film unit comprising:
   (a) a photosensitive element as defined in claim 11;
   (b) a second sheet-like element adapted to be superposed on said photosensitive element during or after photoexposure;
   (c) an image-receiving layer positioned in one of said photosensitive or sheet-like elements; and
   (d) a rupturable container releasably holding an aqueous alkaline processing composition and so positioned as to be adapted to distribute said processing composition between predetermined layers of said elements.

20. The film unit as defined in claim 19 wherein said second sheet-like element comprises said image receiving layer carried on a transparent support and said processing composition includes a light reflecting pigment adapted to provide a white background against which an image formed in said image receiving layer may be viewed through said transparent support.

21. The diffusion transfer color process as defined in claim 3 wherein said image dye-providing material is a dye developer represented by the formula:

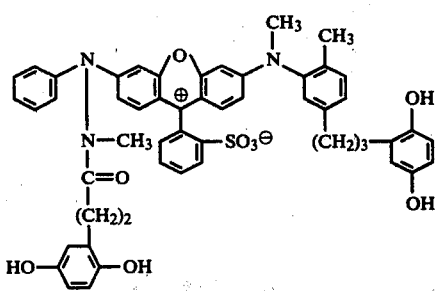

22. The photosensitive element as defined in claim 13 wherein said image dye-providing material is a dye developer represented by the formula:

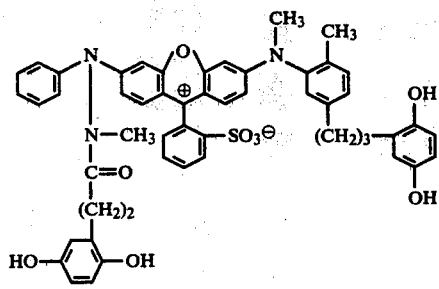

* * * * *